(12) United States Patent
Kawaguchi

(10) Patent No.: US 7,512,187 B2
(45) Date of Patent: Mar. 31, 2009

(54) MOBILE STATION CAPABLE OF CHANNEL ESTIMATION USING SUBSTANTIAL SINGLE ANTENNA AT PATH SWITCHING, CHANNEL ESTIMATING APPARATUS AND ITS RECEIVING METHOD

(75) Inventor: Daisuke Kawaguchi, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 618 days.

(21) Appl. No.: 11/235,256

(22) Filed: Sep. 27, 2005

(65) Prior Publication Data

US 2006/0067385 A1    Mar. 30, 2006

(30) Foreign Application Priority Data

Sep. 28, 2004   (JP)   ............................. 2004-281385

(51) Int. Cl.
 *H04B 7/02*   (2006.01)
(52) U.S. Cl. ..................................... 375/267
(58) Field of Classification Search ................. 375/142, 375/143, 150, 152, 267, 299, 343, 347, 349; 700/53; 455/101, 132–141; 704/216, 218, 704/237, 263; 708/5, 422, 813; 342/108, 342/145, 189, 378

See application file for complete search history.

(56) References Cited

U.S. PATENT DOCUMENTS

| | | | | |
|---|---|---|---|---|
| 2001/0038667 A1* | 11/2001 | Urabe et al. | ................ | 375/152 |
| 2002/0110109 A1* | 8/2002 | Kawaguchi et al. | ......... | 370/342 |
| 2002/0181629 A1* | 12/2002 | Shibata | ...................... | 375/347 |
| 2004/0259517 A1* | 12/2004 | Takahashi et al. | ........... | 455/295 |

FOREIGN PATENT DOCUMENTS

| | | |
|---|---|---|
| JP | 2002-185388 | 6/2002 |
| JP | 2003-8552 | 1/2003 |

* cited by examiner

*Primary Examiner*—Sam K Ahn
(74) *Attorney, Agent, or Firm*—McGinn IP Law Group, PLLC

(57) ABSTRACT

A mobile station receives first and second signals from first and second antennas. A plurality of fingers each demodulate the signals for one propagation path. A Rake combiner combines the demodulated signals by removing phase fluctuations among the fingers. Each finger includes a correlator descrambling the first and second signals for the propagation path, a channel coefficient calculating section calculating first and second channel coefficients of the descrambled signals, first and second average channel coefficient calculating sections calculating first and second average channel coefficients of the first and second channel coefficients, respectively, a synchronous detector performing a synchronous detection upon the descrambled signals using the average channel coefficients, and a channel coefficient clearing section detecting a path switching of the first and second signals to clear either one of the first and second channel coefficients or one of the first and second average channel coefficients.

20 Claims, 19 Drawing Sheets

TO STEP 303 OF Fig. 3

TO STEP 304 OF Fig. 3

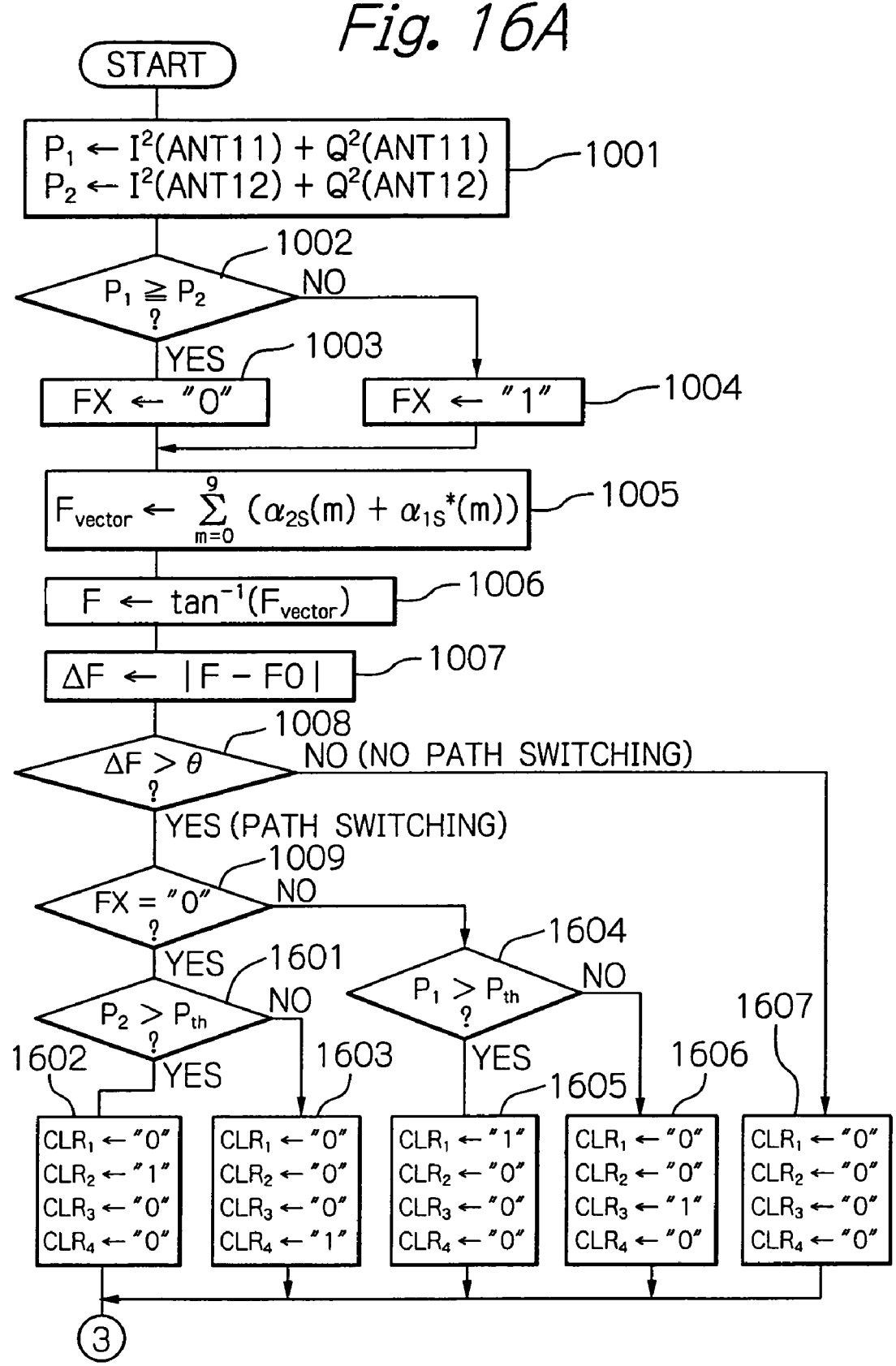

MOBILE STATION CAPABLE OF CHANNEL ESTIMATION USING SUBSTANTIAL SINGLE ANTENNA AT PATH SWITCHING, CHANNEL ESTIMATING APPARATUS AND ITS RECEIVING METHOD

BACKGROUND OF THE INVENTION

1. Field of the Invention

The present invention relates to a mobile communication system and its communication method using a transmission diversity method.

2. Description of the Related Art

Generally, in a wideband code division multiple access (W-CDMA) system, a transmission diversity method where two or more antennas are provided in a base station has been used to improve the sensitivity of downstream signals from the base station to a mobile station.

On the other hand, signals from a base station are transmitted via a plurality of propagation paths, i.e., multi-paths to a mobile station. For example, signals from the base station are reflected by a building to reach the mobile station, and simultaneously, the signals are reflected by another building to reach the mobile station.

In order to improve the quality of received signals in a W-CDMA system using a transmission diversity method, in a prior art mobile station including a radio receiver circuit adapted to receive first and second signals from first and second antennas of a base station, a plurality of fingers each adapted to demodulate the first and second signals for one propagation path, and a Rake combiner adapted to combine demodulated signals of the fingers by removing phase fluctuations among the fingers are provided. Each of the fingers is constructed by a correlator adapted to descramble the first and second signals for the propagation path, a channel coefficient calculating section adapted to calculate first and second channel coefficients of the descrambled first and second signals, first and second average channel coefficient calculating sections adapted to calculate first and second average channel coefficients of the first and second channel coefficients, respectively, and a synchronous detector adapted to perform a synchronous detection upon the descrambled first and second signals using the first and second average channel coefficients (see: JP-2002-185388). This will be explained later in detail.

In the above-described prior art mobile station, in order to further improve the quality of received signals, the number of the fingers can be increased to increase the number of detected multipaths. In this case, however, the number of the correlators is increased so that the mobile station would be increased in size and also, the power consumption would be increased. On the other hand, in order to further improve the quality of received signals, the number of symbols used for calculating the average channel coefficients can be increased. In this case, however, even when the receiving path is switched from one to another by the fading phenomenon, it would be impossible to detect such switching of the receiving path so that the channel coefficients would be erroneously estimated. After all, the quality of received signals would deteriorate.

Additionally, in the above-described prior art mobile station, electric field strengths of the received signals from the antennas of the base station are detected and compared with a predetermined threshold value. When at least one of the electric field strengths is lower than the predetermined threshold value, the corresponding average channel coefficient calculating section is forcibly deactivated so that the power consumption would be decreased. Even this case, however, since the electric field strengths of the received signals from the antennas of the base station do not always represent the switching of the receiving path, it would be impossible to detect switching of he receiving path from one to another, so that the channel coefficients would be erroneously estimated.

SUMMARY OF THE INVENTION

It is an object of the present invention to provide a mobile station and its receiving method capable of further improving the quality of received signals without increasing the size and the power consumption thereof.

Another object is to provide a channel estimating apparatus used in the above-mentioned mobile station.

According to the present invention, in a mobile station including a radio receiver circuit adapted to receive first and second signals from first and second antennas of a base station, a plurality of fingers each adapted to demodulate the first and second signals for one propagation path, and a Rake combiner adapted to combine demodulated signals of the fingers by removing phase fluctuations among the fingers are provided. Each of the fingers is constructed by a correlator adapted to descramble the first and second signals for the propagation path, a channel coefficient calculating section adapted to calculate first and second channel coefficients of the descrambled first and second signals, first and second average channel coefficient calculating sections adapted to calculate first and second average channel coefficients of the first and second channel coefficients, respectively, a synchronous detector adapted to perform a synchronous detection upon the descrambled first and second signals using the first and second average channel coefficients, and a channel coefficient clearing section adapted to detect a path switching of the first and second signals to clear either one of the first and second channel coefficients or one of the first and second average channel coefficients. Thus, even in a W-CDMA system using two-antenna transmission diversity method, the channel estimation is substantially carried out by using one antenna, which would further improve the quality of received signals.

BRIEF DESCRIPTION OF THE DRAWINGS

The present invention will be more clearly understood from the description set forth below, as compared with the prior art, with reference to the accompanying drawings, wherein:

FIGS. 16A and 16B are flowcharts for explaining the operation of the central processing unit of FIG. 15.

DESCRIPTION OF THE PREFERRED EMBODIMENTS

Before the description of the preferred embodiments, a prior art mobile station will be explained with reference to FIGS. 1, 2, 3, 4, 5, 6, 7 and 8A to 8H (see: JP-2002-185388-A).

Figure 1:
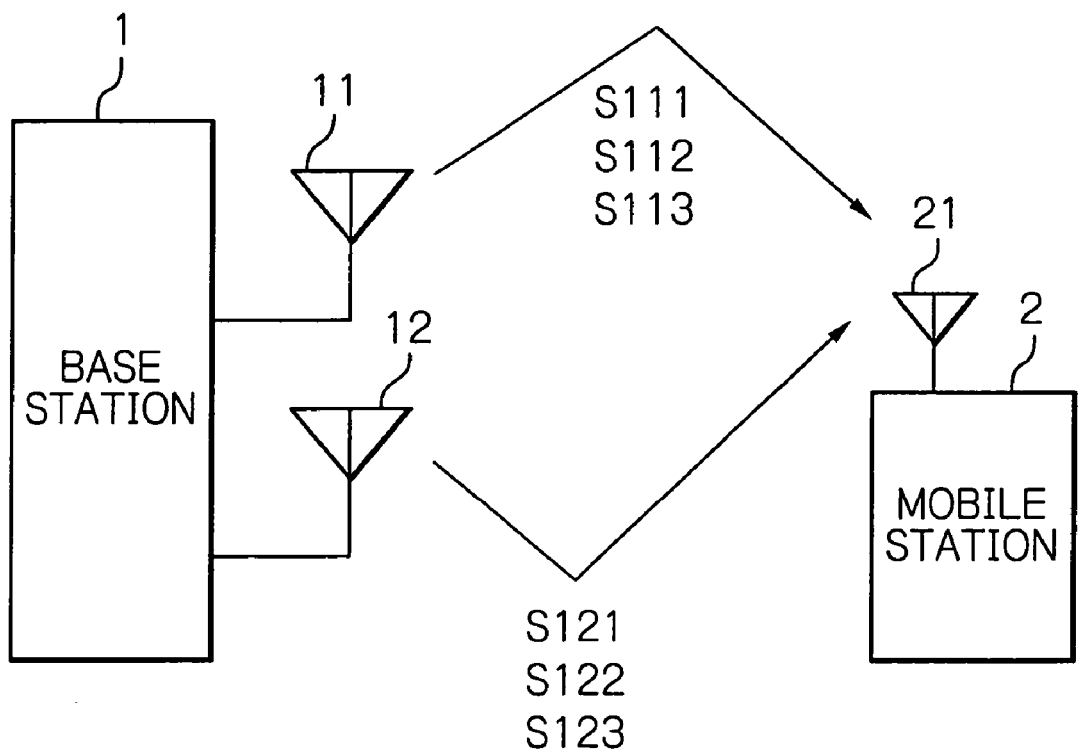
FIG. 1 is a circuit diagram illustrating a prior art W-CDMA system.

In FIG. 1, which illustrates a prior art W-CDMA system using a transmission diversity method, a base station 1 has two antennas 11 and 12 spaced at a definite distance, and a mobile station 2 has one antenna 21.

Transmitted from the antenna 11 of the base station 1 to the antenna 21 of the mobile station 2 are a primary common pilot channel (P-CPICH) signal S111, a primary common control physical channel (P-CCPCH) signal S112 and a dedicated physical channel (DPCH) signal S113. Also transmitted from the antenna 12 of the base station 1 to the antenna 21 of the mobile station 2 are a P-CPICH signal S121, a P-CCPCH signal S122 and a DPCH signal S123.

Each of the P-CPICH signals S111 and S121 are different from each other and include predetermined bit and symbol sequences used for estimating a channel.

Each of the P-CCPCH signals S112 and S122 are the same as each other and include a broadcast channel formed by system information, cell information and the like defined by one cell.

Each of the DPCH signals S113 and S123 are the same as each other and include a dedicated physical data channel (DPDCH) and a dedicated physical common channel (DPCCH). The DPDCH is formed by speech data, video data and the like, and the DPCCH is formed by transmit power control (TPC) information, transport format combination indicator (TFCI) information, pilot information and the like. The DPDCH and the DPCCH are time-divisionally multiplexed.

Figure 2:
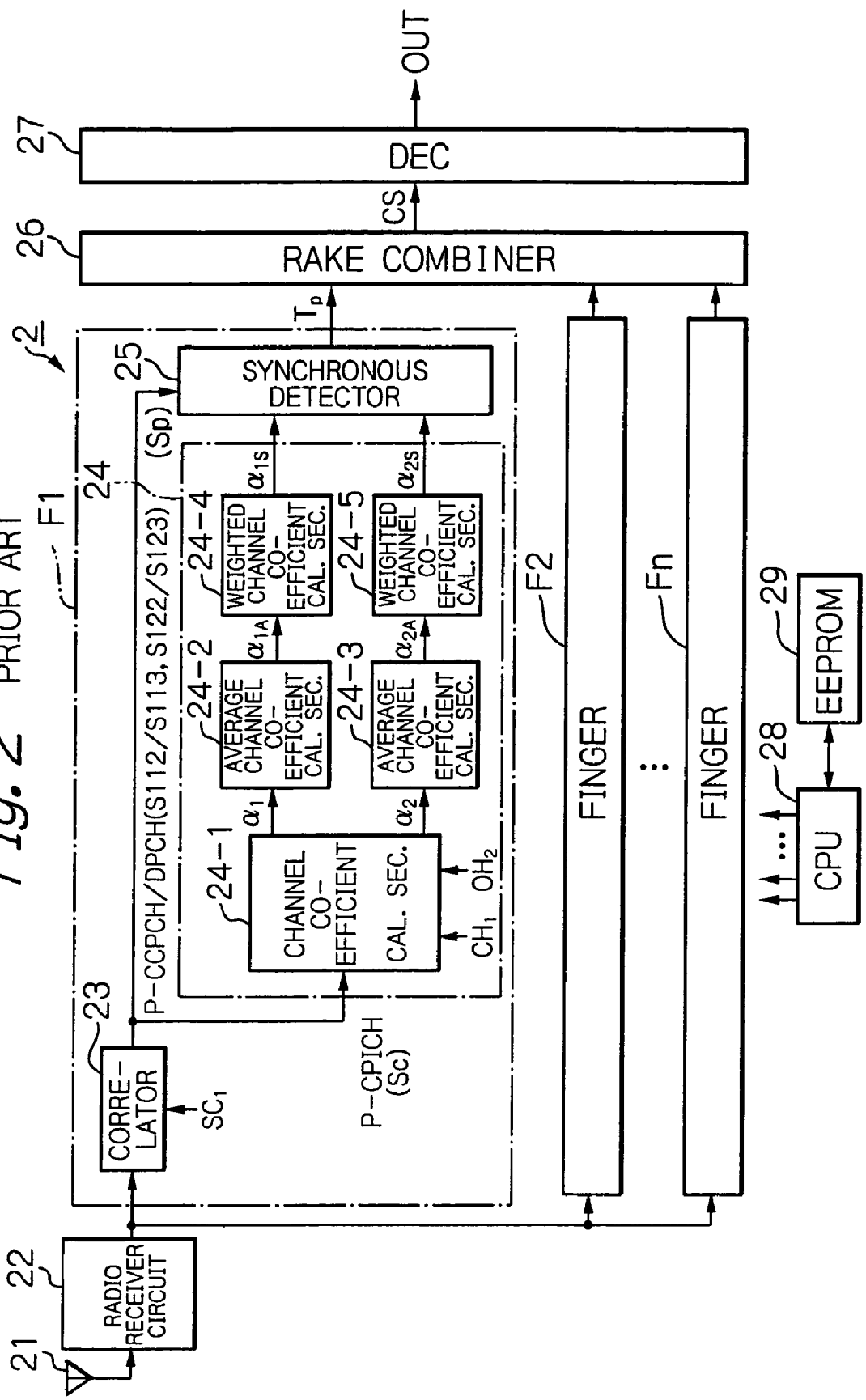
FIG. 2 is a detailed block circuit diagram of the mobile station of FIG. 1.

In FIG. 2, which is a detailed block circuit diagram of the mobile station 2 of FIG. 1, the antenna 21 is connected to a radio receiver circuit 22 which is also connected to a correlator 23. The correlator 23 is connected to a channel estimating circuit 24 which is also connected with the correlator 23 to a synchronous detector 25.

The channel estimating circuit 24 is constructed by a channel coefficient calculating section 24-1, average channel coefficient calculating sections 24-2 and 24-3 and weighted channel coefficient calculating sections 24-4 and 24-5.

The correlator 23, the channel estimating circuit 24 and the synchronous detector 25 form a finger F1.

Similar fingers F2, . . . , Fn to the finger F1 are connected to the radio receiver circuit 22.

Each of the fingers F1, F2, . . . , Fn are provided for one propagation path from the base station 1 to the mobile station 2. That is, the scrambling codes of the correlators of the fingers F1, F2, . . . , Fn are different from each other.

The fingers F1, F2, . . . , Fn are connected to a Rake combiner 26 which is also connected to a decoder 27 for generating output data OUT.

The radio receiver circuit 22, the fingers F1, F2, . . . , Fn, the Rake combiner 26 and the decoder 27 are controlled by a central processing unit (CPU) 28 which is connected to a memory 29 such as an electrically-erasable programmable read-only memory (EEPROM).

The radio receiver circuit 22 receives the P-CPICH signal S111, the P-CCPCH signal S112 and the DPCH signal S113 from the antenna 11 of the base station 1 as well as the P-CPICH signal S121, the P-CCPCH signal S122 and the DPCH signal S123 from the antenna 12 of the base station 1, and transmits them to the fingers F1, F2, . . . , Fn.

The correlator 23 descrambles the signals received from the radio receiver circuit 22 using a scrambling code SC, peculiar to the finger F1. The descrambled signals are transmitted to the channel estimating section 24 and the synchronous detector 25.

The channel coefficient calculating section 24-1 calculates complex channel coefficients $\alpha_1$ for the P-CPICH signal S111, and also, a complex channel coefficients $\alpha_2$ for the P-CPICH signal S121, by using channeling codes $CH_1$ and $CH_2$. Note that the channeling codes $CH_1$ and $CH_2$ can be the same among the fingers F1, F2, . . . , Fn.

The average channel coefficient calculating section 24-2 calculates an average value $\alpha_{1A}$ of the complex channel coefficients $\alpha_1$ for the P-CPICH signal S111 calculated by the channel coefficient calculating section 24-1. In more detail, the average channel coefficient calculating section 24-2 carries out an in-phase addition between the complex channel coefficients $\alpha_1$ for the P-CPICH signal S111 calculated by the channel coefficient calculating section 24-1 to generate average complex channel coefficients $\alpha_{1A}$ which are transmitted to the weighted channel coefficient calculating section 24-4. On the other hand, the average channel coefficient calculating section 24-3 calculates average values $\alpha_{2A}$ of the complex channel coefficients $\alpha_2$ for the P-CPICH signal S121 calculated by the channel coefficient calculating section 24-1. In more detail, the average channel coefficient calculating section 24-3 carries out an in-phase addition between the complex channel coefficients $\alpha_2$ for the P-CPICH signal S121 calculated by the channel coefficient calculating section 24-1 to generate average complex channel coefficients $\alpha_{2A}$ which are transmitted to the weighted channel coefficient calculating section 24-5.

The weighted channel coefficient calculating section 24-4 calculates weighted complex channel coefficients (channel estimated values) $\alpha_{1S}$ of the average complex channel coefficients $\alpha_{1A}$. On the other hand, the weighted channel coefficient calculating section 24-5 calculates weighted complex channel coefficients (channel estimated values) $\alpha_{2S}$ of the average complex channel coefficients $\alpha_{2A}$.

The synchronous detector 25 performs a synchronous detection upon the received signals $S_P$ such as the P-CCPCH signals S112 (S122) and the DPCH signals S113 (S123) by using the conjugate components of the weighted channel coefficients $\alpha_{1S}$ and $\alpha_{2S}$, so that the P-CCPCH signals and the DPCH signals are orthogonally demodulated in a space time transition diversity (STTD) format. In this case, use is made of the pilot information of the DPCCH of the DPCH signals S113 and 123 as a reference phase, so that demodulated signals $T_P$ are generated and transmitted to the Rake combiner 26.

The Rake combiner 26 combines the demodulated signals $T_P$ of the fingers F1, F2, . . . , Fn by removing the phase fluctuations among the fingers F1, F2, . . . , Fn to generate a combined signal CS. This is called a maximal-ratio combining (MRC) diversity.

The decoder 27 decodes the combined signal CS. For example, the combined P-CCPCH signals are decoded to generate a broadcast channel including system information and cell information. Also, the combined DPCH signals are decoded to generate speech data and video data.

Figure 3:
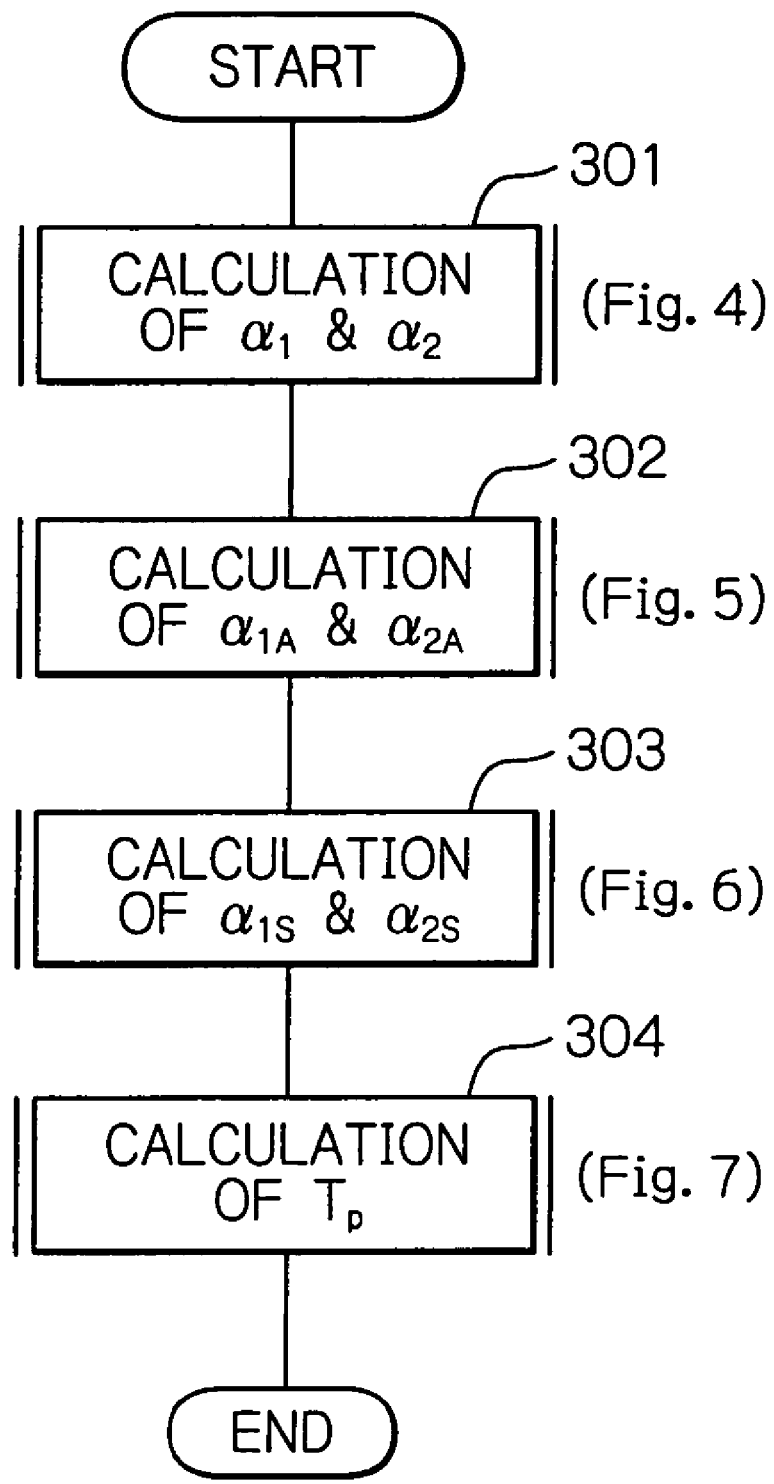
FIG. 3 is a flowchart for explaining the operation of the central processing unit of FIG. 2.

The channel coefficient calculating section 24-1, the average channel coefficient calculating sections 24-2 and 24-3, and the weighted channel coefficient calculating sections 24-4 and 24-5 and the synchronous detector 25 can be controlled by the CPU 28; in this case, their operation can be carried out by programs stored in the memory 29, as illustrated in FIGS. 3, 4, 5, 6 and 7, where the P-CCPCH signal and the DPCH signal are composed of 10 ms/frame, 15 slots/frame and 10 symbols/slot whose first symbol has no data. Also, the flowchart of FIG. 3 is carried out for every two slots, i.e., one even slot and one odd slot.

Figure 8:
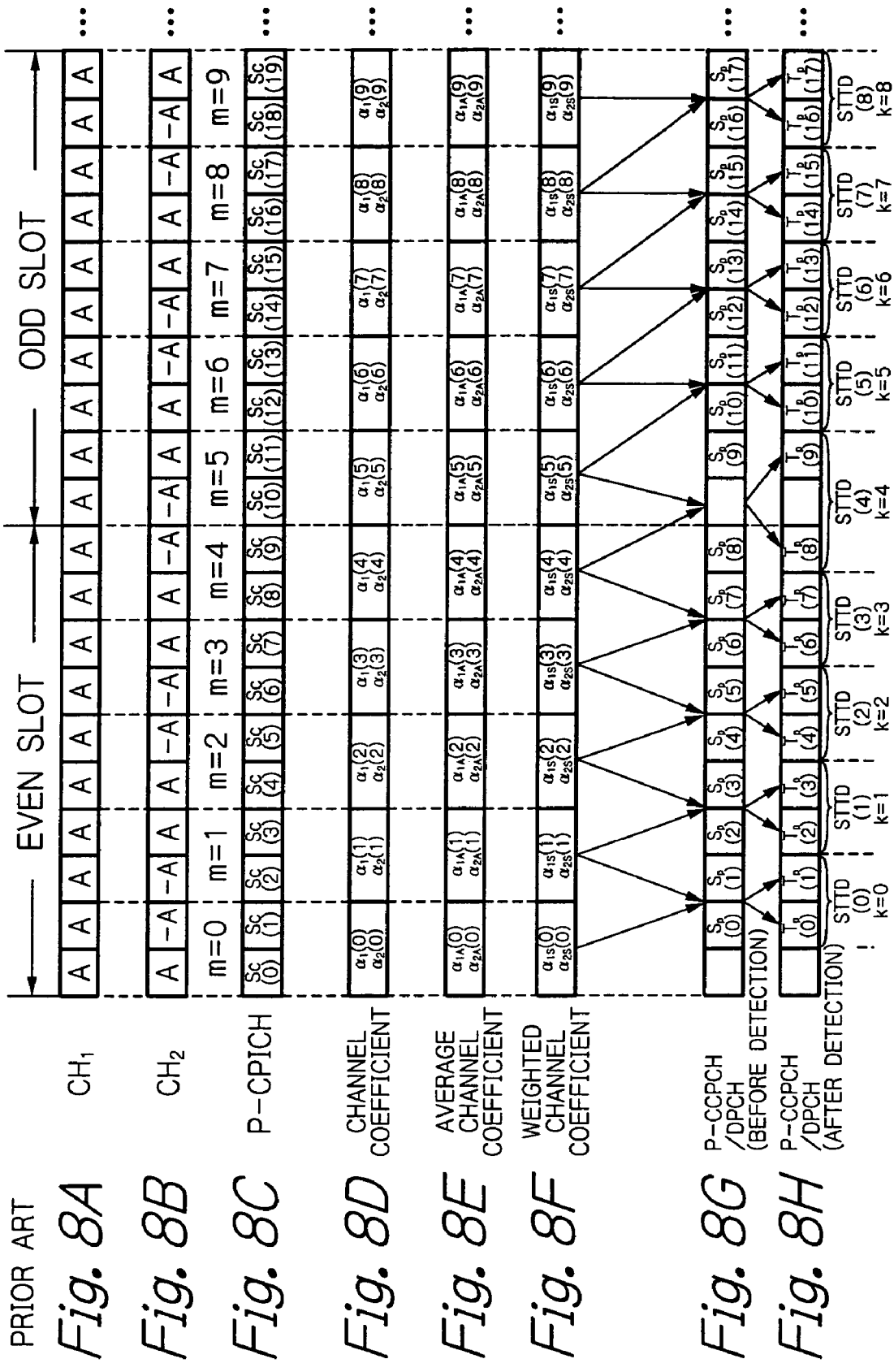
FIGS. 8A, 8B, 8C, 8D, 8E, 8F, 8G and 8H are timing diagrams for explaining the flowcharts of FIGS. 3, 4, 5, 6 and 7.

As illustrated in FIGS. 8A and 8B, the symbol sequence of the channeling code $CH_1$ for the P-CPICH signal from the antenna 11 is different from that of the channeling code $CH_2$ of the P-CPICH signal for the antenna 12, where A=(1, 1) and −A=(−1, −1). In this case, (A, A) of the channeling code $CH_1$ and (A, −A) of the channeling code $CH_2$ form an even pair, and (A, A) of the channeling code $CH_1$ and (−A, A) of the channeling code $CH_2$ form an odd pair. Also, the P-CPICH signals from the antennas 11 and 12 are defined by Sc(0), Sc(1), . . . , Sc(19) stored in a buffer (not shown), as illustrated in FIG. 8C.

First, at step 301, complex channel coefficients $\alpha_1(m)$ and $\alpha_2(m)$ (m=0, 1, . . . , 9) are calculated. The details will be explained with reference to FIG. 4.

Next, at step 302, average complex channel coefficients $\alpha_{1A}(m)$ and $\alpha_{2A}(m)$ (m=0, 1, . . . , 9) are calculated. The details will be explained with reference to FIG. 5.

Next, at step 303, weighted complex channel coefficients $\alpha_{1S}(m)$ and $\alpha_{2S}(m)$ (m=0, 1, . . . , 9) are calculated. The details will be explained with reference to FIG. 6.

Finally, at step 304, demodulated signals $T_P(k)$ (k=0, 1, . . . , 17) are calculated. The details will be explained with reference to FIG. 7.

The channel coefficient calculating step 301 of FIG. 3 is explained with reference to FIG. 4 below.

First, at step 401, a value m is initialized, i.e., m=0.

Next, at step 402, it is determined whether or not m is 0, 2, . . . , or 8. When m=0, 2, . . . , or 8, the channeling codes $CH_1$ and $CH_2$ form an even pair, so that the control proceeds to steps 303 and 304. On the other hand, when m=1, 3, . . . , or 9, the channeling codes $CH_1$ and $CH_2$ form an odd pair, so that the control proceeds to steps 405 and 406.

At step 403, a complex channel coefficient $\alpha_1(m)$ for the P-CPICH signal S111 is calculated by $$\alpha_1(m) \leftarrow (Sc(4m)+Sc(4m+1)) \cdot A^*/2 \quad (1)$$

where Sc(4m) and Sc(4m+1) are data of the P-CPICH signal at symbols 4m and 4m+1 as illustrated in FIG. 8C; and $A^*$ is a conjugate complex of A. Also, at step 304, a complex channel coefficient $\alpha_2(m)$ for the P-CPICH signal S121 is calculated by $$\alpha_2(m) \leftarrow (Sc(4m)-Sc(4m+1)) \cdot A^*/2 \quad (2)$$

On the other hand, at step 405, a complex channel coefficient $\alpha_2(m)$ for the P-CPICH signal S121 is calculated by $$\alpha_2(m) \leftarrow (Sc(4m+2)+Sc(4m+3)) \cdot A^*/2 \quad (3)$$

where Sc(4m) and Sc(4m+1) are data of the P-CPICH signal at symbols 4m+2 and 4m+3 as illustrated in FIG. 8C. Also, at step 406, a complex channel coefficient $\alpha_2(m)$ for the P-CPICH signal S121 is calculated by $$\alpha_2(m) \leftarrow (-Sc(4m+2)+Sc(4m+3)) \cdot A^*/2 \quad (4)$$

Steps 407 and 408 repeat the operation at steps 402 to 406 until m equal 9. As a result, complex channel coefficients $\alpha_1(0), \alpha_2(0), \alpha_1(1), \alpha_2(1), \ldots, \alpha_1(9)$ and $\alpha_2(9)$ are calculated as illustrated in FIG. 8D and stored in the buffer.

Then, the control returns to step 302 of FIG. 3.

The average channel coefficient calculating step 302 of FIG. 3 is explained with reference to FIG. 5 below.

First, at step 501, the value m is again initialized, i.e., m=0.

Next, at step 502, an average complex channel coefficient $\alpha_{1A}(m)$ of the complex channel coefficient $\alpha_1(n)$ is calculated by $$\alpha_{1A}(m) \leftarrow (\alpha_1(m)+\alpha_1(m+1))/2 \quad (5)$$

Also, at step 503, an average complex channel coefficient $\alpha_{2A}(m)$ of the complex channel coefficient $\alpha_2(m)$ is calculated by $$\alpha_{2A}(m) \leftarrow (\alpha_2(m)+\alpha_2(m+1))/2 \quad (6)$$

Steps 504 and 505 repeat the operation at steps 502 to 503 which are called a four-symbol in-phase adding operation until m equal 9. As a result, average complex channel coefficients $\alpha_{1A}(0), \alpha_{2A}(0), \alpha_{1A}(1), \alpha_{2A}(1), \ldots, \alpha_{1A}(9)$ and $\alpha_{2A}(9)$ are calculated as illustrated in FIG. 8E and stored in the buffer. In this case, note that $\alpha_1(10)$ and $\alpha_2(10)$ of the next even slot will be required for calculating $\alpha_{1A}(9)$ and $\alpha_{1B}(9)$.

Note that the above-mentioned formulae (5) and (6) can be replaced by the following six-symbol in-phase adding operation:

$$\alpha_{1A}(m) \leftarrow (\alpha_1(m-1)+\alpha_1(m)+\alpha_1(m+1))/3 \quad (7)$$

$$\alpha_{2A}(m) \leftarrow (\alpha_2(m-1)+\alpha_2(m)+\alpha_2(m+1))/3 \quad (8)$$

In this case, note that $\alpha_1(9)$ and $\alpha_2(9)$ of the previous odd slot as well as $\alpha_1(10)$ and $\alpha_2(10)$ of the next even slot will be required for calculating $\alpha_{1A}(10)$ and $\alpha_{2A}(10)$.

Also, the above-mentioned formulae (5) and (6) can be replaced by the following twelve-symbol in-phase adding operation:

$$\alpha_{1A}(m) \leftarrow (\alpha_1(m-4)+\alpha_1(m-3)+\alpha_1(m-2)+\alpha_1(m-1)+\alpha_1(m)+\alpha_1(m+1))/6 \quad (9)$$

$$\alpha_{2A}(m) \leftarrow (\alpha_2(m-4)+\alpha_2(m-3)+\alpha_2(m-2)+\alpha_2(m-1)+\alpha_2(m)+\alpha_2(m+1))/6 \quad (10)$$

In this case, note that $\alpha_1(7), \alpha_1(8), \alpha_2(7)$ and $\alpha_2(8)$ of the previous odd slot as well as $\alpha_1(9), \alpha_2(9), \alpha_1(10)$ and $\alpha_2(10)$ of the next even slot will be required for calculating $\alpha_{1A}(0)$ and $\alpha_{2A}(0)$.

Then, the control returns to step 303 of FIG. 3.

The weighted channel coefficient calculating step 303 of FIG. 3 is explained with reference to FIG. 6 below.

First, at step 601, the value m is further initialized, i.e., m=0.

Next, at step 602, a weighted complex channel coefficient $\alpha_{1S}(m)$ of the average complex channel coefficient $\alpha_{1A}(m)$ is calculated by $$\alpha_{1S}(m) \leftarrow \lambda \cdot \alpha_{1S}(m-1)+(1-\lambda) \cdot \alpha_{1A}(m) \quad (11)$$

where $\alpha_{1S}(m-1)$ is a weighted complex channel coefficient at the previous slot; and $\lambda$ is a complex weighted coefficient ($0 \leq \lambda \leq 1$).

Also, at step 603, a weighted complex channel coefficient $\alpha_{2S}(m)$ of the average complex channel coefficient $\alpha_{2A}(m)$ is calculated by $$\alpha_{2S}(m) \leftarrow (\lambda \cdot \alpha_{2S}(m-1)+(1-\lambda) \cdot \alpha_{2A}(m)) \quad (12)$$

Steps 604 and 605 repeat the operation at steps 602 to 603 until m equal 9. As a result, weighted complex channel coefficients $\alpha_{1S}(0)$, $\alpha_{2S}(0)$, $\alpha_{1S}(1)$, $\alpha_{2S}(1)$, . . . , $\alpha_{1S}(9)$ and $\alpha_{2S}(9)$ are calculated as illustrated in FIG. 8F and stored in the buffer.

The complex weighted coefficient $\lambda$ is determined to substantially make the directions of the weighted channel coefficients $\alpha_{1S}(0)$, $\alpha_{2S}(0)$, . . . , and $\alpha_{9S}(9)$ coincide with those of the weighted channel coefficients $\alpha_{2S}(0)$, $\alpha_{2S}(0)$, . . . , and $\alpha_{2S}(9)$, to enhance the reception gain (see: JP-2003-8552-A).

Then, the control returns to step 304 of FIG. 3.

The demodulated signal calculating step 304 of FIG. 3 is explained next with reference to FIG. 7.

First, at step 701, a value k is initialized, i.e., k=0.

Next, at steps 702 and 703, a synchronous detection operation is performed upon data of the CCPCH or DPCH signal, $$T_P(2k) \leftarrow \alpha_S*(k) \cdot S_P(2k)+\alpha_{2S}(k) \cdot S_P*(2k+1) \quad (13)$$

$$T_P(2k+1) \leftarrow -\alpha_{2S}(k) \cdot S_P*(2k)+\alpha_{1S}*(k) \cdot S_P(2k+1) \quad (14)$$

where $S_P(2k)$ and $S_P(2k+1)$ are data of the P-CCPCH or DPCH signal as illustrated in FIG. 8G;

$S_P*(2k)$ and $S_P*(2k+1)$ are conjugate complexes of $S_P(2k)$ and $S_P(2k+1)$, respectively; and $\alpha_{1S}*(k)$ is a conjugate complex of $\alpha_S(k)$.

Steps 704 and 705 repeat the operation at steps 702 and 703 until k equal 8. As a result, $T_P(0)$, $T_P(1)$, . . . , $T_P(16)$ and $T_P(17)$ are calculated as illustrated in FIG. 8H and transmitted to the Rake combiner 26.

In the mobile station 2 of FIG. 2, in order to further improve the quality of received signals, the number of the fingers F1, F2, . . . , Fn can be increased to increase the number of detected multipaths. In this case, however, the number of the correlators 23 is increased so that the mobile station 2 would be increased in size and also, the power consumption would be increased. On the other hand, in order to further improve the quality of received signals, the number of symbols used for calculating the average channel coefficients $\alpha_{1A}$ and $\alpha_{2A}$ can be increased as in the formulae (7) and (8) or the formulae (9) and (10). In this case, however, even when the receiving path is switched from one to another by the fading phenomenon, it would be impossible to detect such switching of the receiving path so that the channel coefficients would be erroneously estimated. After all, the quality of received signals would deteriorate.

Additionally, in the mobile station 2 of FIG. 2, electric field strengths of the received signals from the antennas 11 and 12 of the base station 1 are detected and compared with a predetermined threshold value. When at least one of the electric field strengths is lower than the predetermined threshold value, the corresponding average channel coefficient calculating section 24-2 or 24-3 and the corresponding weighted channel coefficient calculating section 24-4 or 24-5 are forcibly deactivated so that the power consumption would be decreased. Even in this case, however, since the electric field strengths of the received signals from the antennas 11 and 12 of the base station 1 do not always represent the switching of the receiving path, it would be impossible to detect switching of the receiving path from one to another, so that the channel coefficients would be erroneously estimated.

Figure 9:
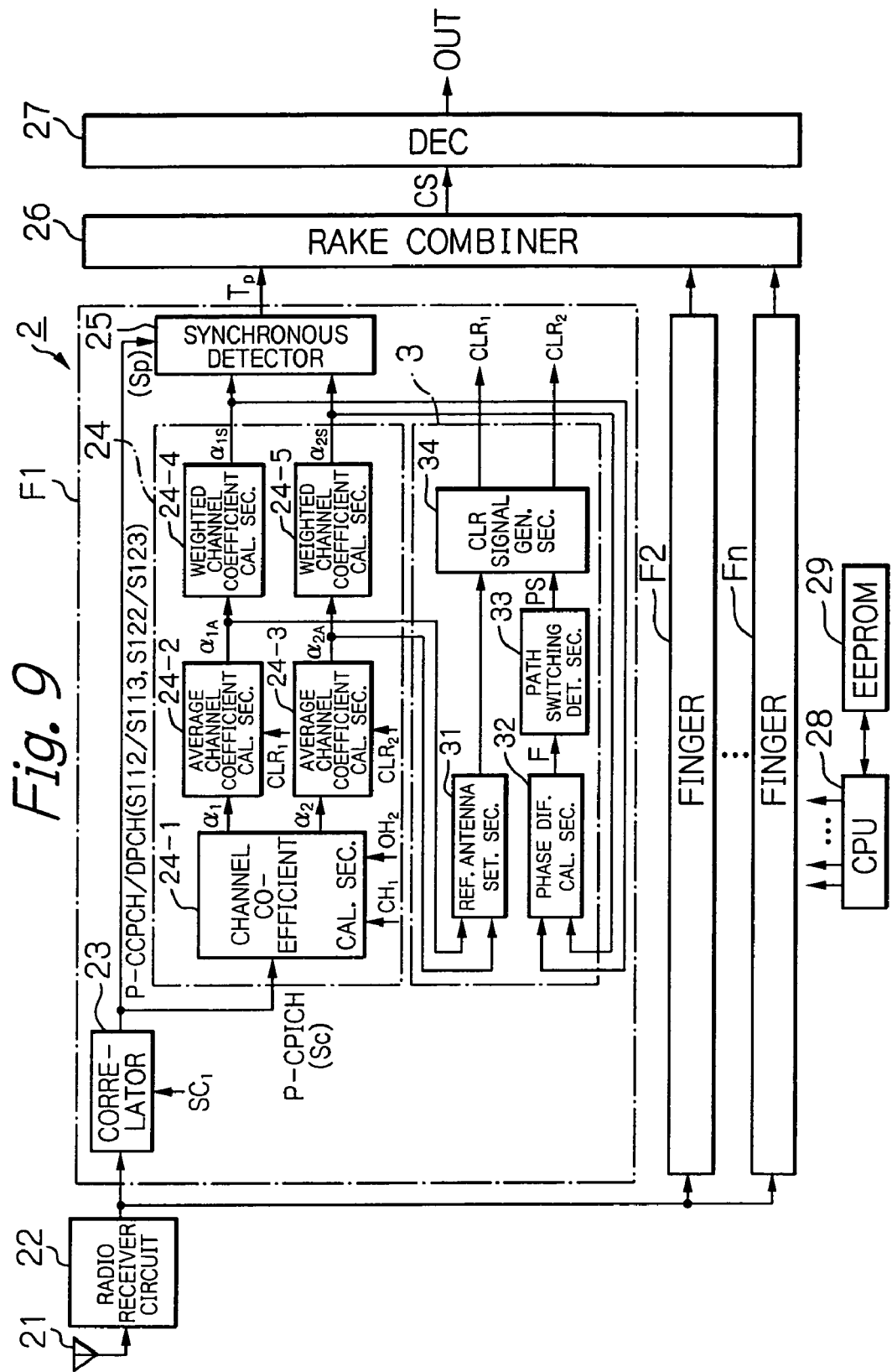
FIG. 9 is a block circuit diagram illustrating a first embodiment of the mobile station according to the present invention.

In FIG. 9, which illustrates a first embodiment of the mobile station according to the present invention, a channel coefficient clearing section 3 is added to each of the fingers F1, F2, . . . , Fn.

The channel coefficient clearing section 3 is constructed by a reference antenna setting section 31 for receiving the average channel coefficients $\alpha_{1A}$ and $\alpha_{2A}$ from the average channel coefficient calculating sections 24-2 and 24-3 to cause one of the antennas 11 and 12 to be a reference antenna and the other to be a non-reference antenna, a phase difference calculating section 32 for receiving the weighted channel coefficients $\alpha_{1S}$ and $\alpha_{2S}$ from the weighted channel coefficient calculating sections 24-4 and 24-5 to calculate a phase difference between the received signals from the antennas 11 and 12, a path switching determining section 33 for receiving the phase difference from the phase difference calculating section 32 to determine whether the phase difference is larger than a predetermined threshold value, and an average channel coefficient clearing signal generating section 34 for generating a clearing signal $CLR_1$ or $CLR_2$ in accordance with the non-reference antenna when the phase difference is larger than the predetermined threshold value.

In more detail, the reference antenna setting section 31 calculates the electric field strength of the received signal from the antenna 11 of the base station 1, i.e., a power value $P_1$, $$P_1 \leftarrow I^2(ANT11) \text{ and } Q^2(ANT11) \quad (13)$$

where I(ANT11) is a in-phase (I) component of $\alpha_{1A}$; and

Q is a quadrature (Q) component of $\alpha_{1A}$. Also, the reference antenna setting section 31 calculates the electric field strength of the received signal from the antenna 12 of the base station 1, i.e., a power value $P_2$, $$P_2 \leftarrow I^2(ANT12) \text{ and } Q^2(ANT12) \quad (14)$$

where I(ANT12) is a in-phase (I) component of $\alpha_{2A}$; and

Q is a quadrature (Q) component of $\alpha_{2A}$. As a result, when $P_1 \geq P_2$, the reference antenna setting section 31 causes the antenna 11 to be a reference antenna and the antenna 12 to be a non-reference antenna, while, when $P_1 < P_2$, the reference antenna setting section 31 causes the antenna 12 to be a reference antenna and the antenna 11 to be a non-reference antenna.

The phase difference calculating section 32 calculates $$Fvector \leftarrow \Sigma(\alpha_{2S}(m)+\alpha_{1S}*(m)) \quad (15)$$

where m is 0, 1, . . . , 4 (one slot).

Note that Fvector can be calculated for every two slots (m=0, 1, . . . , 9). Then, the phase difference calculating section 32 calculates a phase difference by $$F \leftarrow \tan^{-1}(Fvector) \quad (16)$$

The path switching determining section 33 compares the fluctuation $\Delta F$ of the phase difference F with a predetermined value $\theta$, i.e., the path switching determining section 33 determines whether or not $$\Delta F=|F-F0|>\theta \quad (17)$$

where F0 is a previous value of the phase difference F. Only when $\Delta F>\theta$ is satisfied, does the path switching determining section 33 generate a path switching signal PS and transmit it to the clearing signal generating section 34.

When the antenna 11 is a non-reference antenna, the clearing signal generating section 34 turns the path switching signal PS into a clearing signal $CLR_1$, so that the average channel coefficient calculating section 24-2 is disabled to clear the average channel coefficients $\alpha_{1A}$. That is, $\alpha_{1A}=0$.

On the other hand, when the antenna 12 is a non-reference antenna, the clearing signal generating section 34 turns the path switching signal PS into a clearing signal $CLR_2$, so that the average channel coefficient calculating section 24-3 is disabled to clear the average channel coefficients $\alpha_{2A}$. That is, $\alpha_{2A}=0$.

In FIG. 9, although the reference antenna setting section 31 causes one of the antennas 11 and 12 to be a reference antenna and the other to be a non-reference antenna in accordance with the average channel coefficients $\alpha_{1A}$ and $\alpha_{2A}$, such setting of a reference antenna and a non-reference antenna can be carried out in accordance with the channel coefficients $\alpha_1$ and $\alpha_2$. Also, although the phase difference calculating section 32 calculates a phase difference F in accordance with the weight channel coefficients $\alpha_{1S}$ and $\alpha_{2S}$, such a phase difference F can be calculated in accordance with the channel coefficients $\alpha_1$ and $\alpha_2$ or the average channel coefficients $\alpha_{1A}$ and $\alpha_{2A}$.

Figure 4:
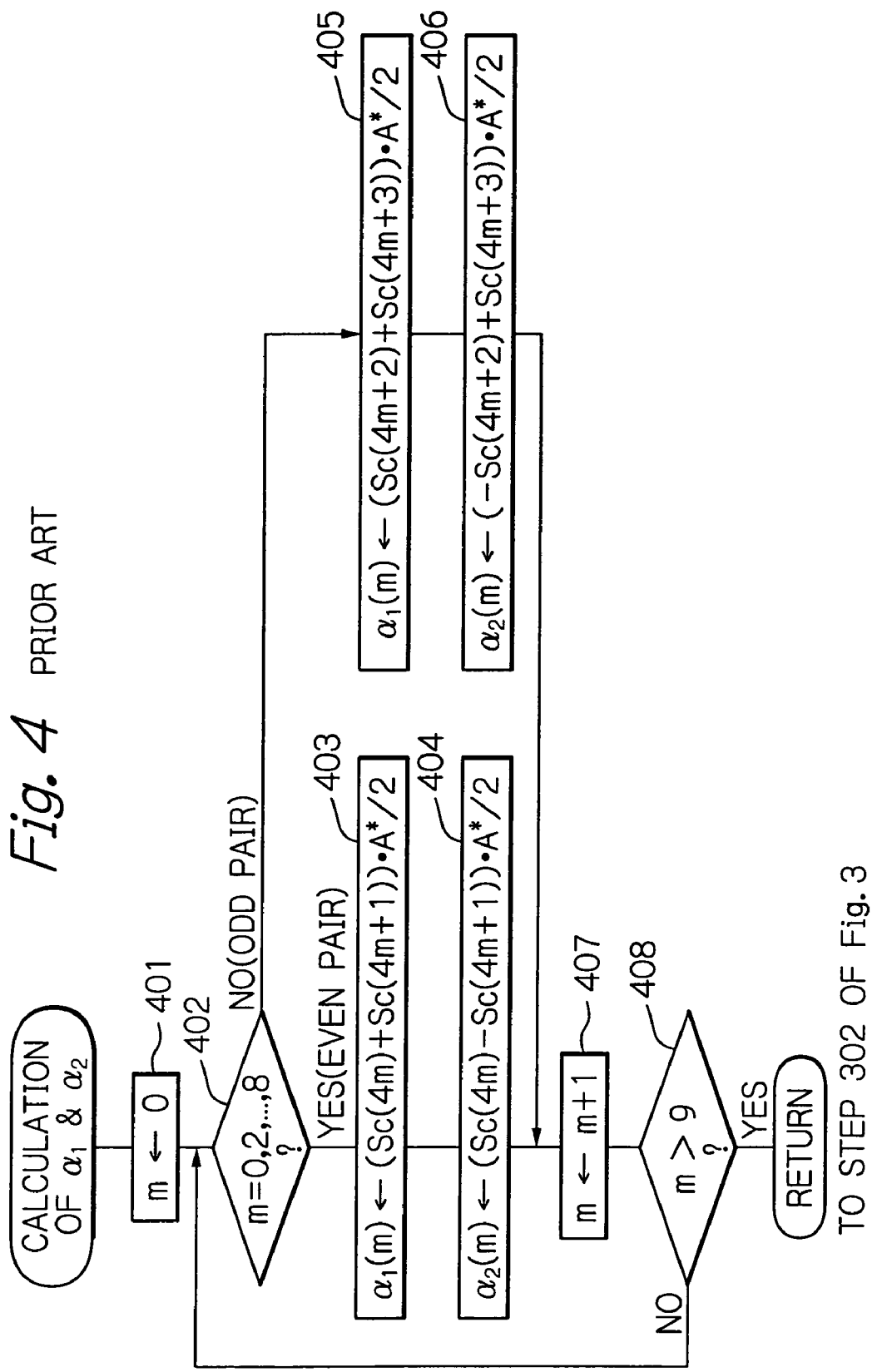
FIG. 4 is a detailed flowchart of the channel coefficient calculating step of FIG. 3.
Figure 6:
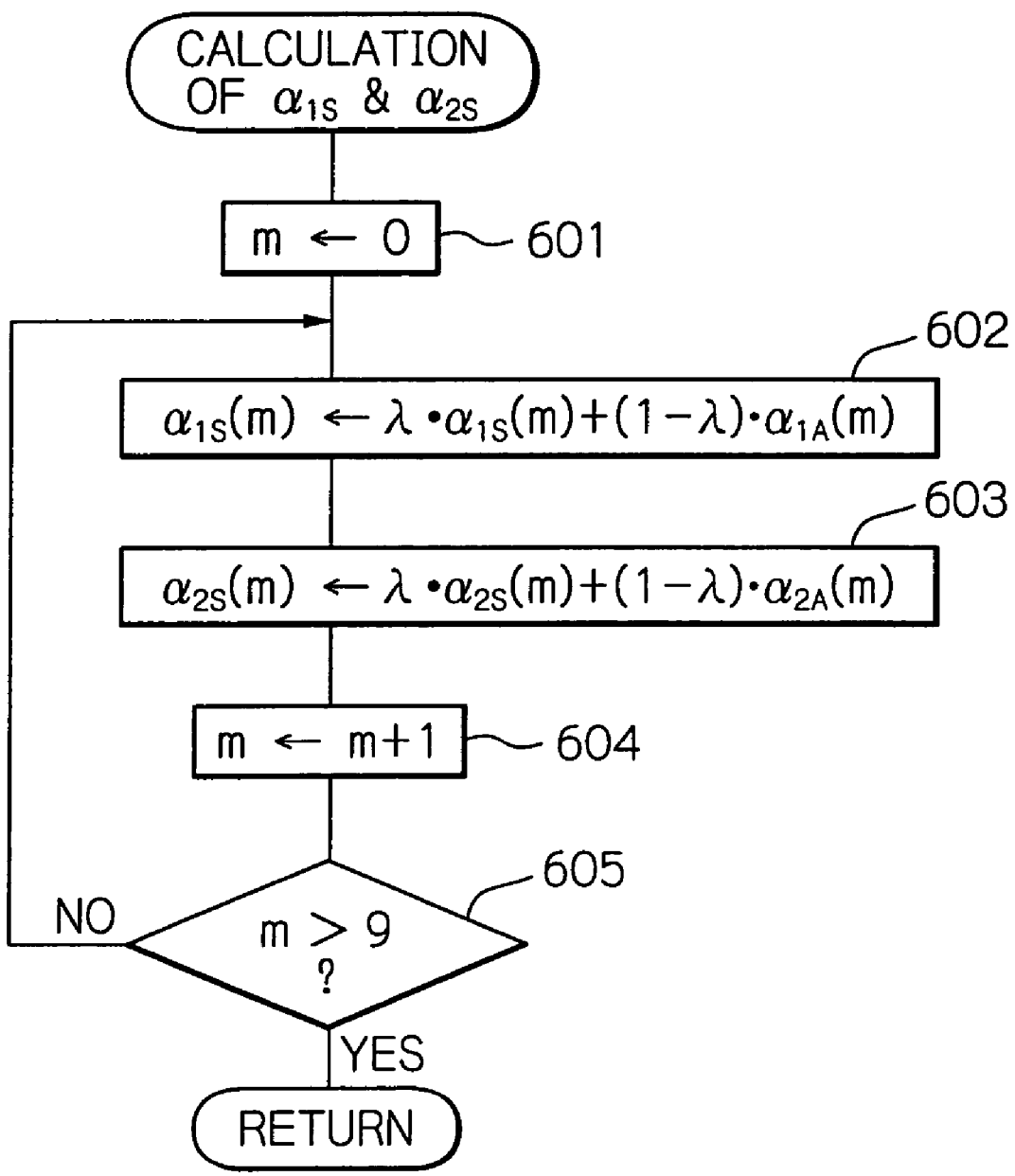
FIG. 6 is a detailed flowchart of the weighted channel coefficient calculating step of FIG. 3.
Figure 7:
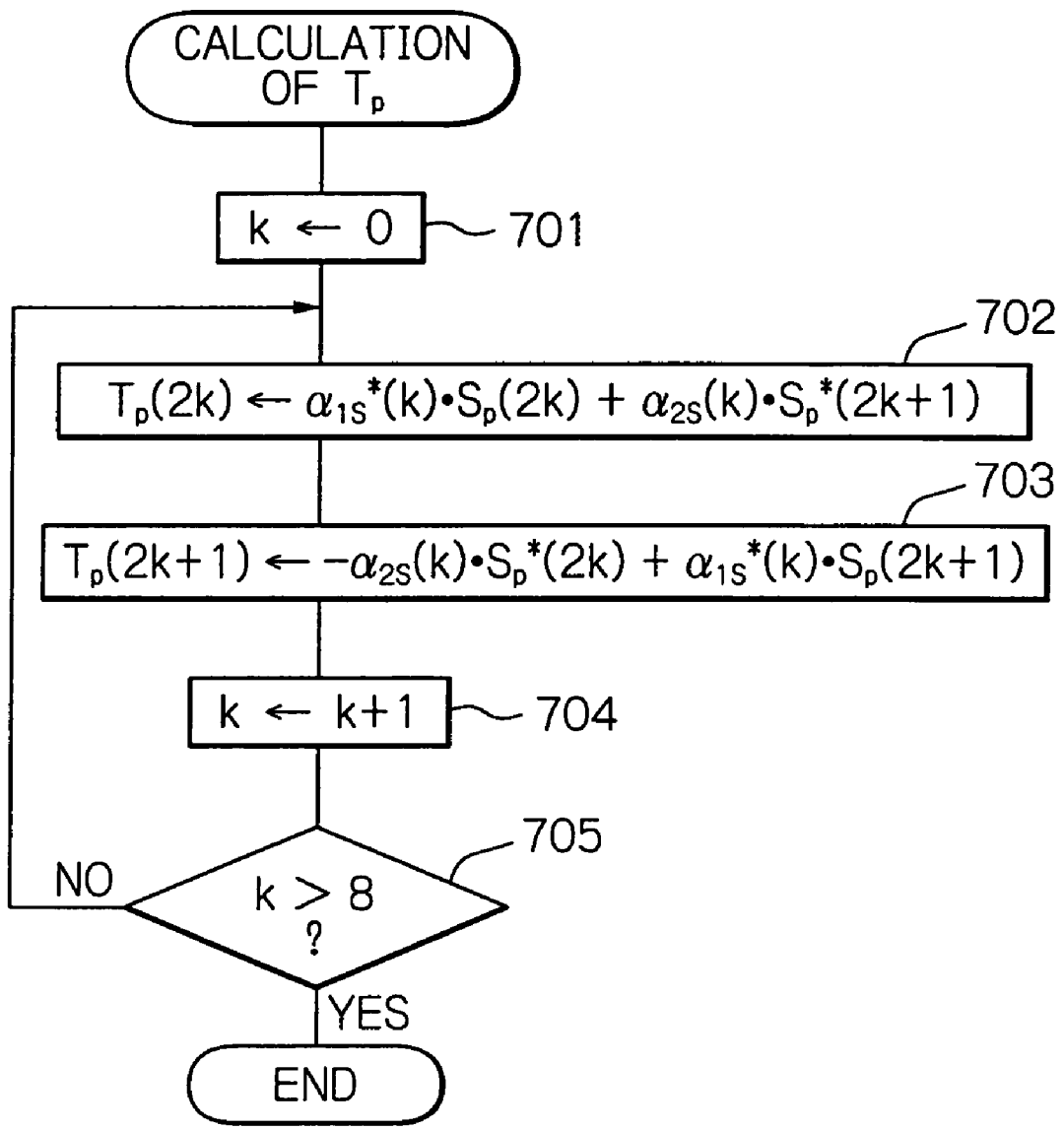
FIG. 7 is a detailed flowchart of the demodulated signal calculating step of FIG. 3.
Figure 10A:
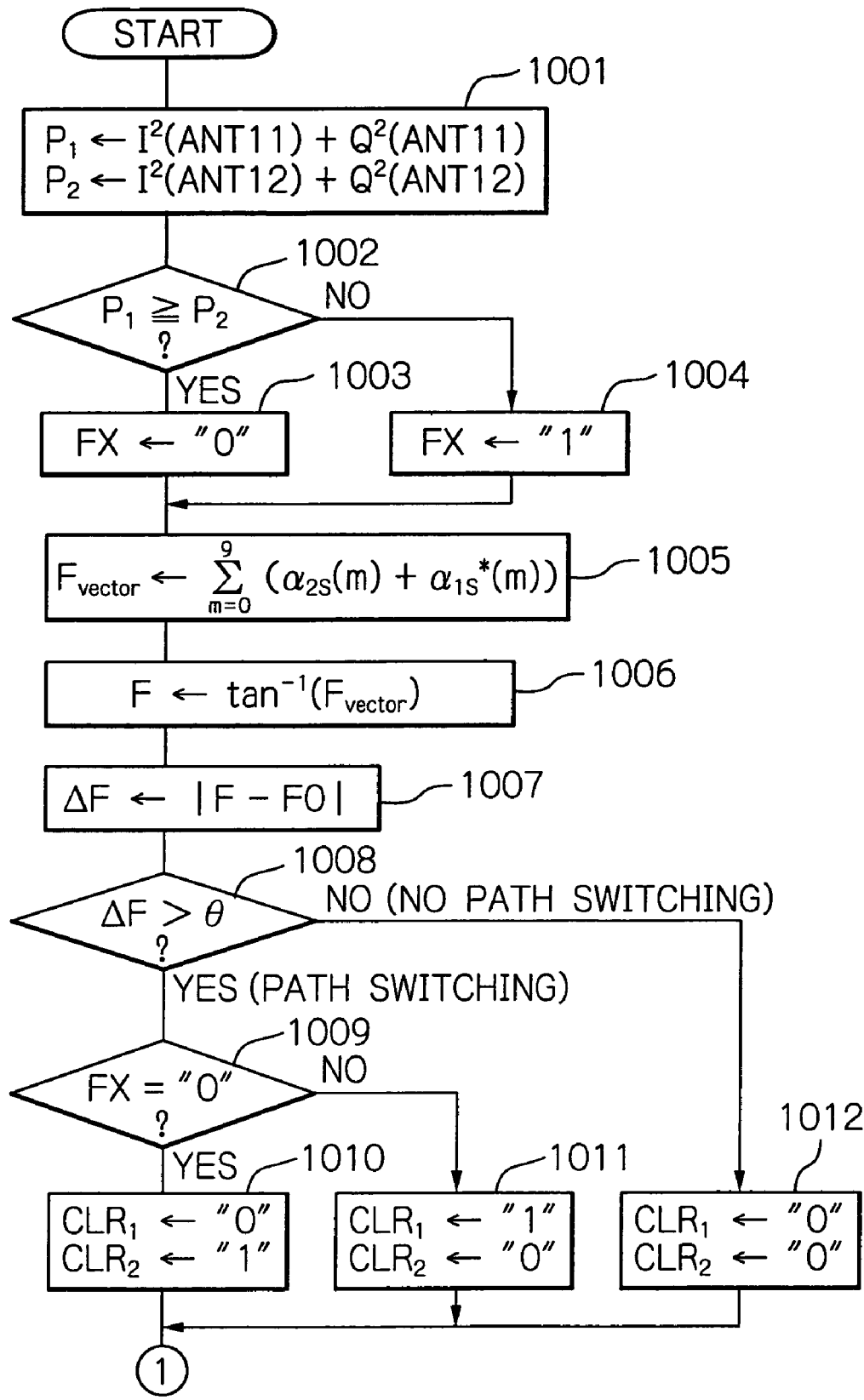
FIGS. 10A and 10B are flowcharts for explaining the operation of the central processing unit of FIG. 9.
Figure 10B:
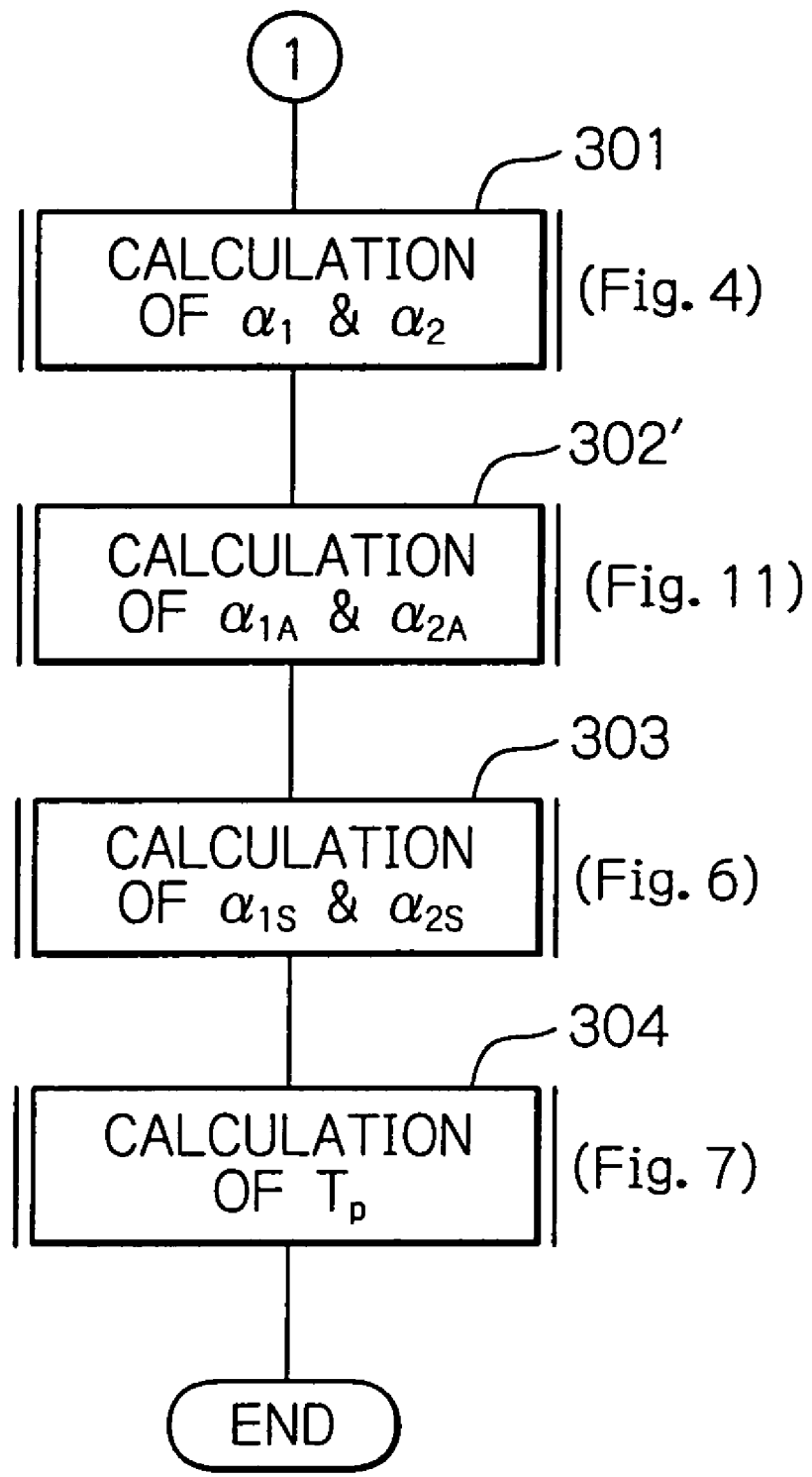
Figure 11:
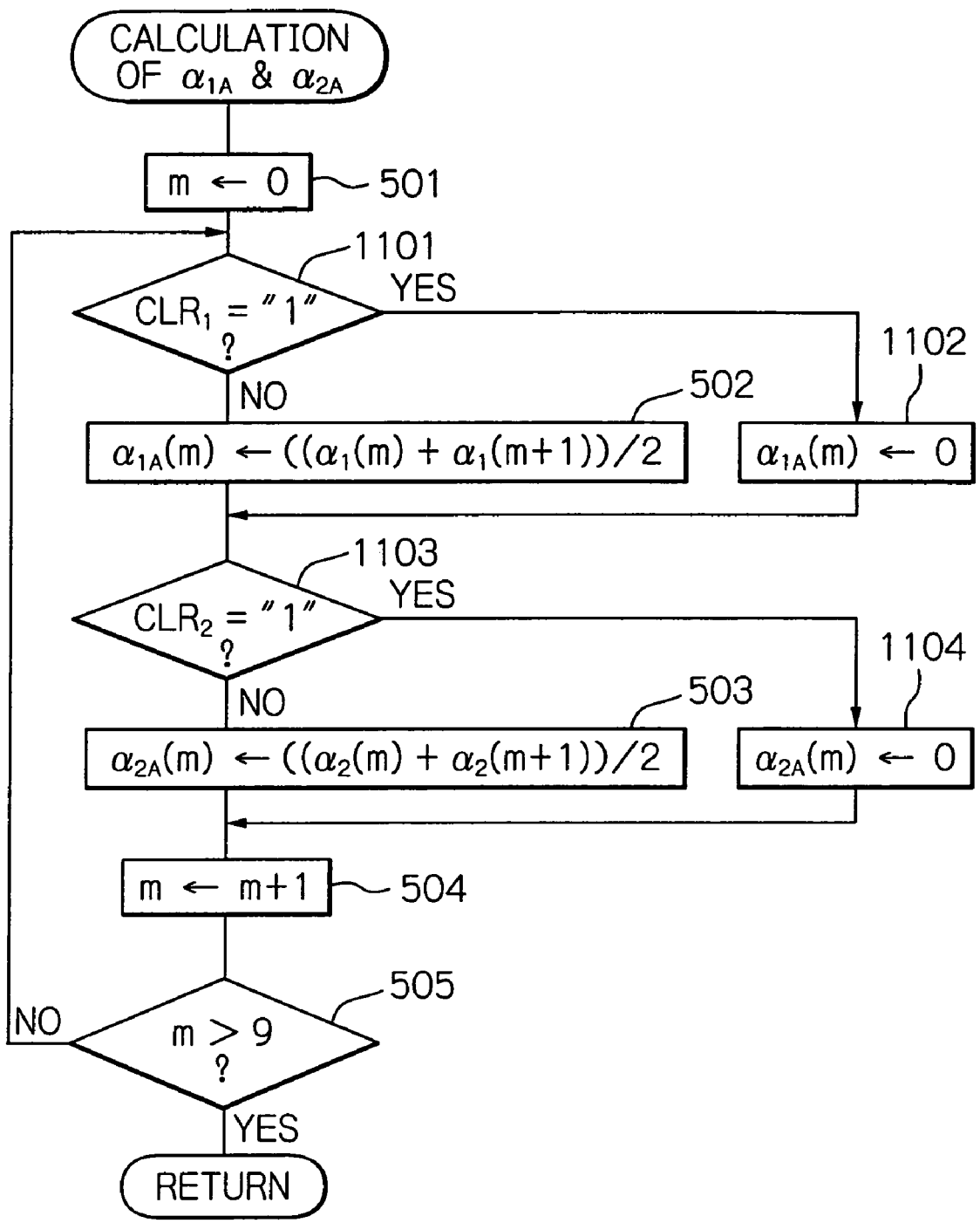
FIG. 11 is a detailed flowchart of the average channel coefficient calculating step of FIG. 10B.

Even in FIG. 9, the channel coefficient calculating section 24-1, the average channel coefficient calculating sections 24-2 and 24-3, and the weighted channel coefficient calculating sections 24-4 and 24-5, the synchronous detector 25 and the channel coefficient clearing section 3 can be controlled by the CPU 28; in this case, their operation can be carried out by programs stored in the memory 29, as illustrated in FIGS. 10A, 10B and 11 as well as FIGS. 4, 6 and 7.

In FIGS. 10A and 10B, steps 1001 to 1012 are added to the routine of FIG. 3 and step 302 of FIG. 3 is modified to step 302' which is illustrated in detail in FIG. 11.

The flowchart of FIGS. 10A and 10B is explained below.

First, at step 1001, a power value $P_1$ of the received signal from the antenna 11 is calculated by $P_1 \leftarrow I^2(ANT11)$ and $Q^2(ANT11)$ (see formula (14)), and a power value $P_1$ of the received signal from the antenna 12 is calculated by $P_2 \leftarrow I^2(ANT12)$ and $Q^2(ANT12)$ (see formula (15)).

Next, at step 1002, it is determined whether or not $P_1 \geq P_2$ is satisfied. As a result, when $P_1 \geq P_2$, the control proceeds to step 1003 which resets a flag FX (FX="0"), while, when $P_1 < P_2$, the control proceeds to step 1004 which sets the flag FX (FX="1"). In this case, the flag FX (="0") means that the antennas 11 and 12 are a reference antenna and a non-reference antenna, respectively, and the flag FX (="1") means that the antennas 11 and 12 are a non-reference antenna and a reference antenna, respectively.

Next, at step 1005, a vector Fvector is calculated by

Fvector $\leftarrow \Sigma(\alpha_{2S}(m)+\alpha_{1S}*(m))$ (see formula (15)).

Next, at step 1006, a phase difference F is calculated by $F \leftarrow \tan^{-1}$(Fvector) (see formula (16)).

Next, at step 1007, a fluctuation $\Delta F$ is calculated by $\Delta F = |F-F0|$ and at step 1008, it is determined whether or not $\Delta F > \theta$ is satisfied (see formula (17)). As a result, when $\Delta F > \theta$, the control proceeds to steps 1009 to 1011, while when $\Delta F \leq \theta$, the control proceeds to step 1012.

At step 1009, it is determined whether or not the flag FX is "0". As a result, when FX="0", the control proceeds to step 1010 which resets a flag $CLR_1$ and sets a flag $CLR_2$, while, when FX="1", the control proceeds to step 1011 which sets the flag $CLR_1$ and resets the flag $CLR_2$.

At step 1012, the flags $CLR_1$ and $CLR_2$ are both reset.

Next, at step 301, complex channel coefficients $\alpha_1(m)$ and $\alpha_2(m)$ (m=0, 1, ..., 9) are calculated in the same way as in FIG. 3.

Next, at step 302', average complex channel coefficients $\alpha_{1A}(m)$ and $\alpha_{2A}(m)$ (m=0, 1, ..., 9) are calculated. The details of step 302' are illustrated in FIG. 11.

Figure 5:
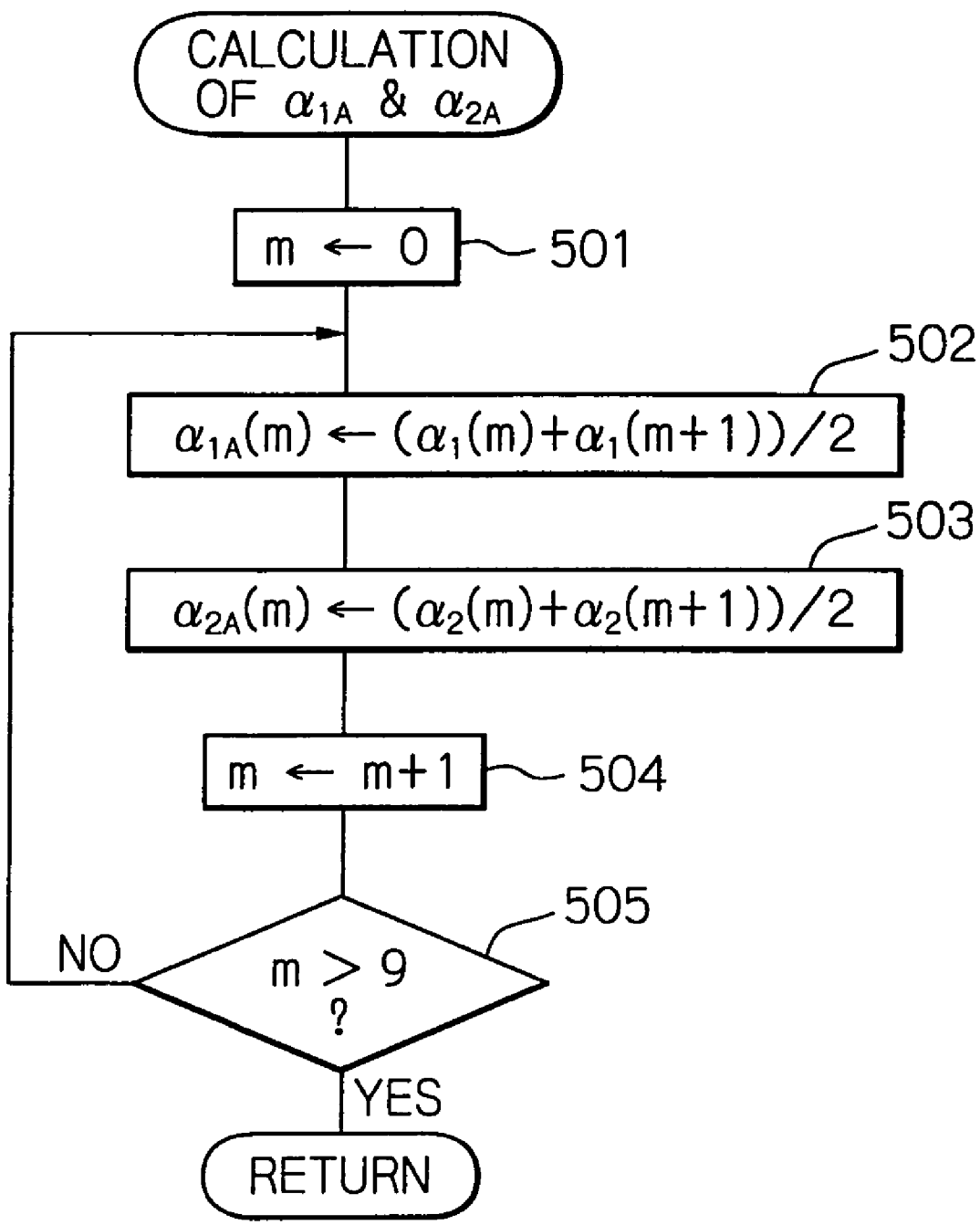
FIG. 5 is a detailed flowchart of the average channel coefficient calculating step of FIG. 3.

In FIG. 11, steps 1101 to 1104 are added to the flowchart of FIG. 5. That is, when it is determined at step 1101 that the flag $CLR_1$ is "1" the control proceeds to step 1102 which clears $\alpha_{1A}(m)$. Also, when it is determined at step 1103 that the flag $CLR_2$ is "1" the control proceeds to step 1104 which clears $\alpha_{2A}(m)$. Thus, the average channel coefficients $\alpha_{1A}(m)$ and $\alpha_{2A}(m)$ are cleared in accordance with the flag $CLR_1$ and $CLR_2$, respectively.

Returning to FIG. 10B, at step 303, weighted complex channel coefficients $\alpha_{1S}(m)$ and $\alpha_{2S}(m)$ are calculated in the same way as in FIG. 3.

Next, at step 304, demodulated signals $T_P$ are calculated in the same way as in FIG. 3.

Thus, the flowchart of FIGS. 10A and 10B is completed.

Thus, in the above-described first embodiment, since the estimation of channels is carried out in accordance with a path switching using the fluctuation of a phase difference between the received signals from the antennas 11 and 12, high quality of reception can be obtained without increasing the number of correlators.

Figure 12:
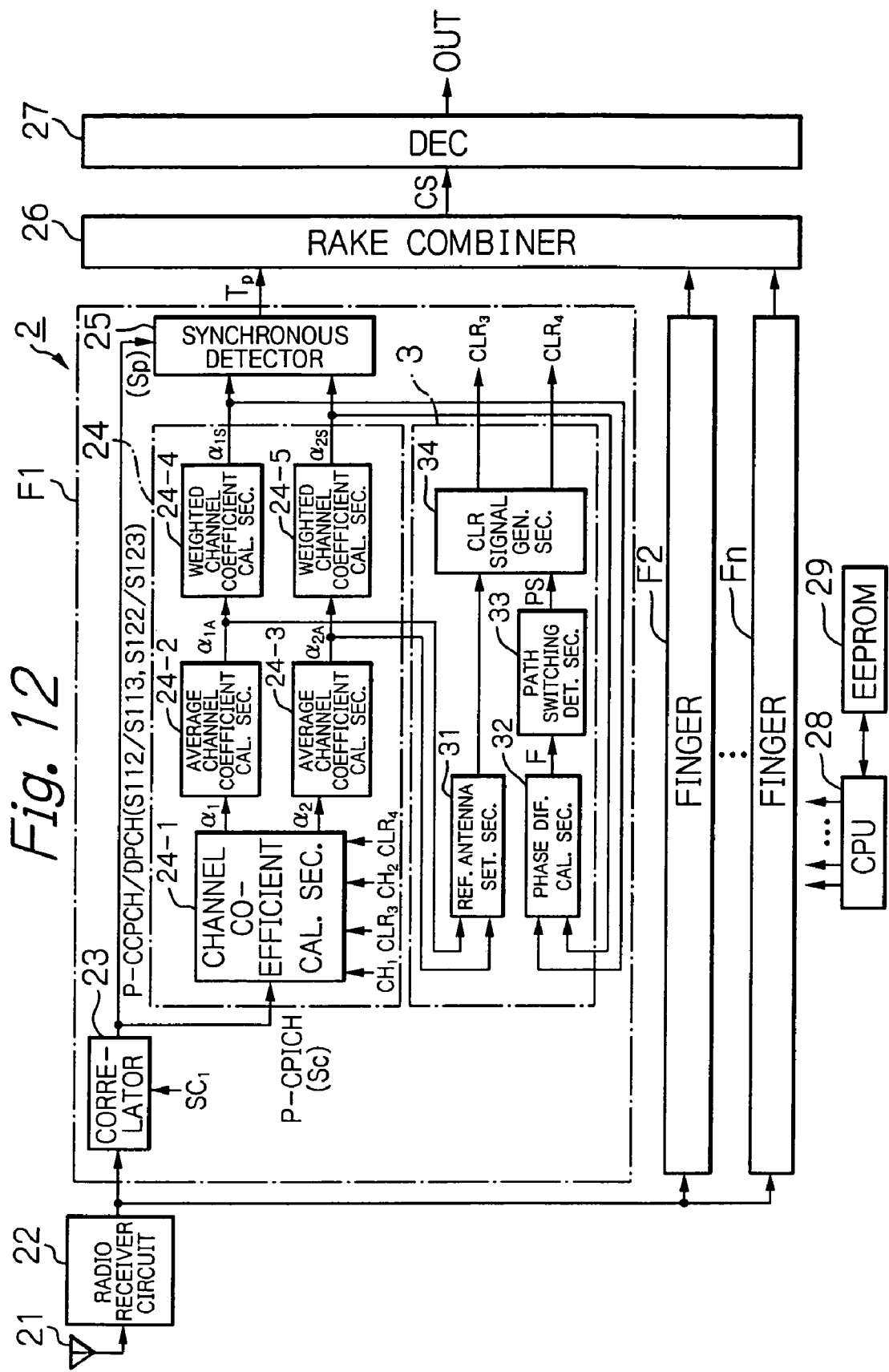
FIG. 12 is a block circuit diagram illustrating a second embodiment of the mobile station according to the present invention.

In FIG. 12, which illustrates a second embodiment of the mobile station according to the present invention, the channel coefficient clearing section 3 transmits clearing signals $CLR_3$ and $CLR_4$ the same as the clearing signals $CLR_1$ and $CLR_2$, respectively, of FIG. 9 to the channel coefficient calculating section 24-1. As a result, when $CLR_3$="1", the channel coefficient calculating section 24-1 clears the channel coefficients $\alpha_1$. That is, $\alpha_1=0$. On the other hand, when $CRL_4$="1", the channel coefficient calculating section 24-1 clears the channel coefficient $\alpha_2$. That is, $\alpha_2=0$.

Even in FIG. 12, although the reference antenna setting section 31 causes one of the antennas 11 and 12 to be a reference antenna and the other to be a non-reference antenna in accordance with the average channel coefficients $\alpha_{1A}$ and $\alpha_{2A}$, such setting of a reference antenna and a non-reference antenna can be carried out in accordance with the channel coefficients $\alpha_1$ and $\alpha_2$.

Figure 13A:
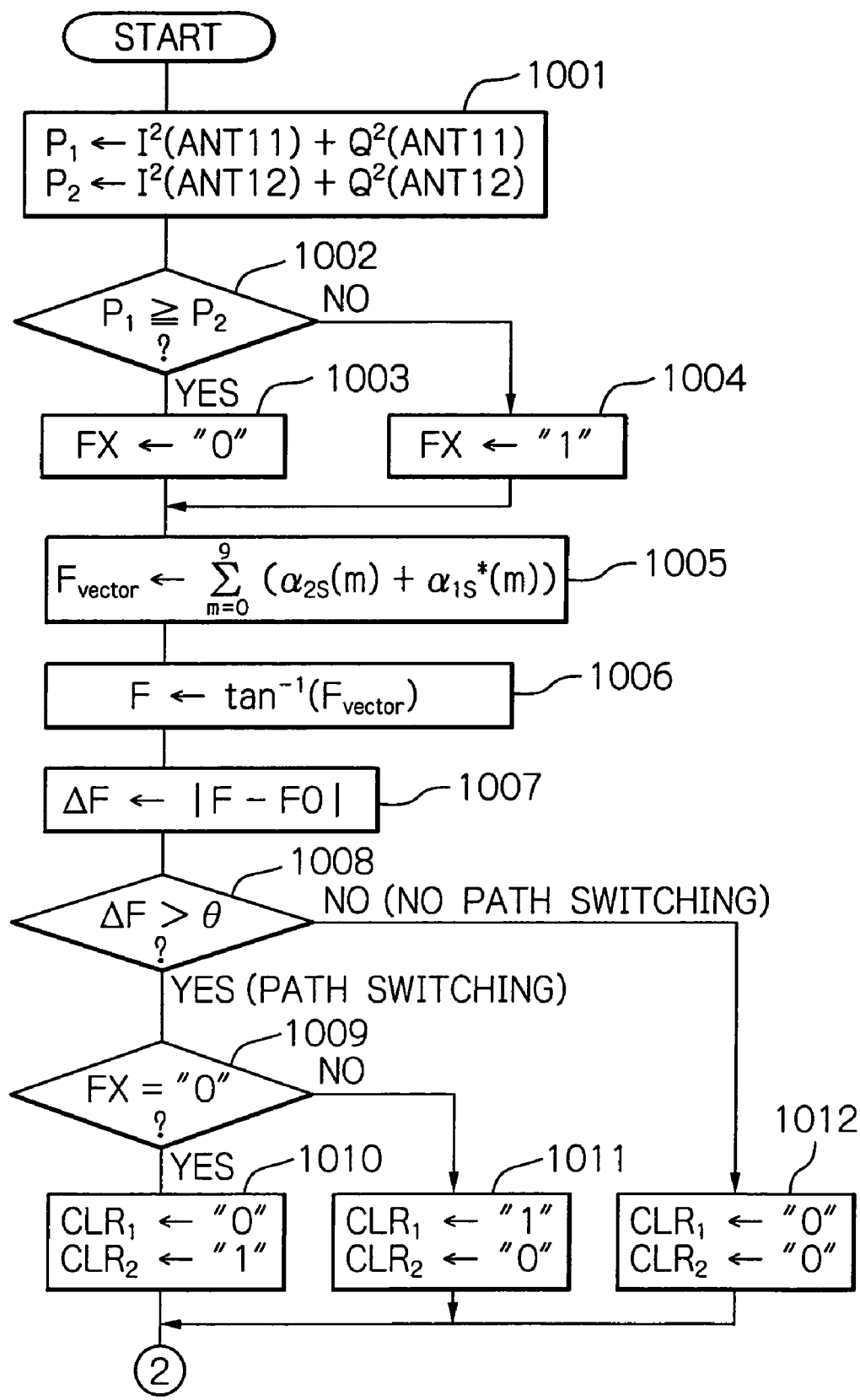
FIGS. 13A and 13B are flowcharts for explaining the operation of the central processing unit of FIG. 12.
Figure 13B:
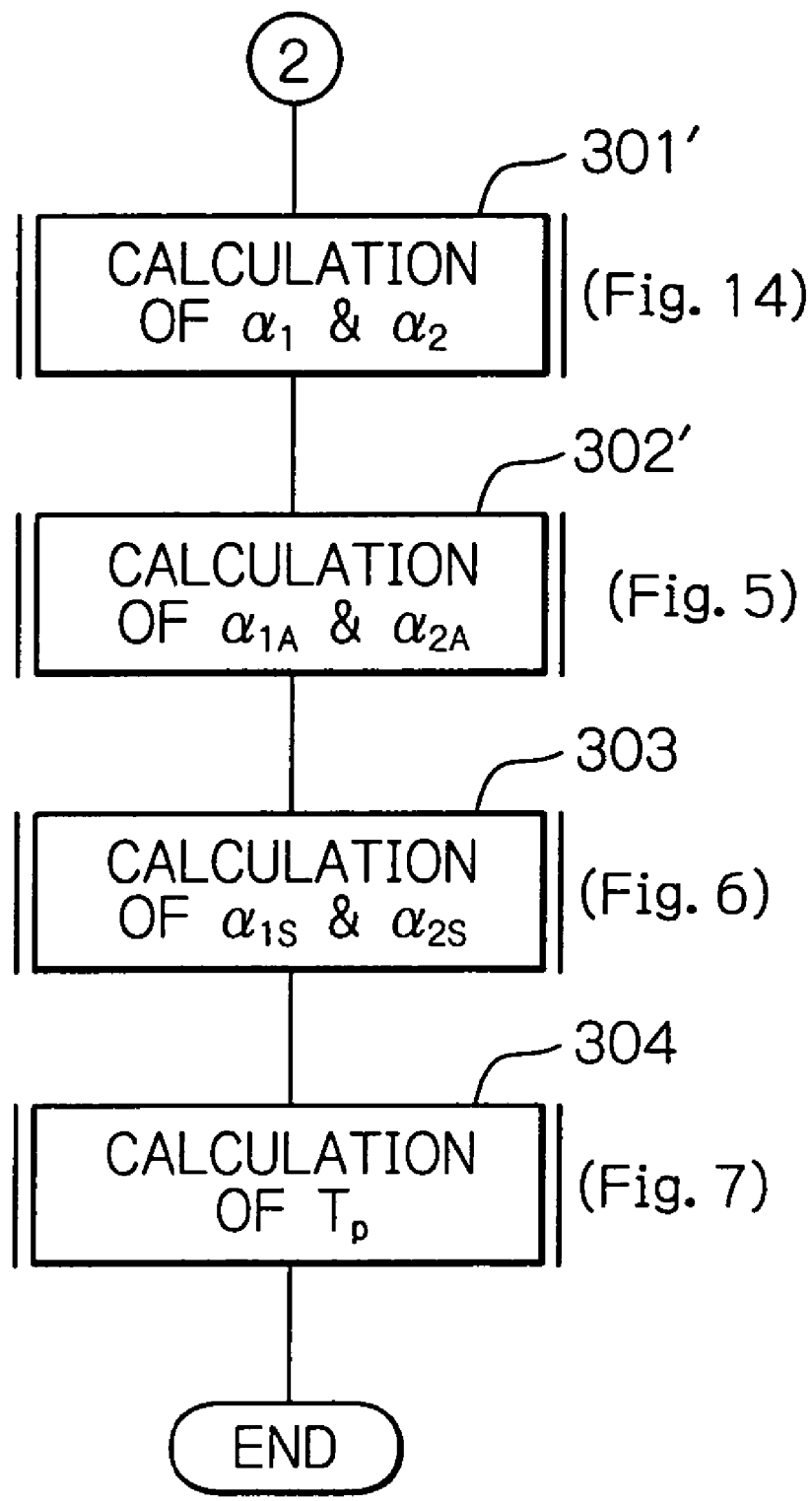
Figure 14:
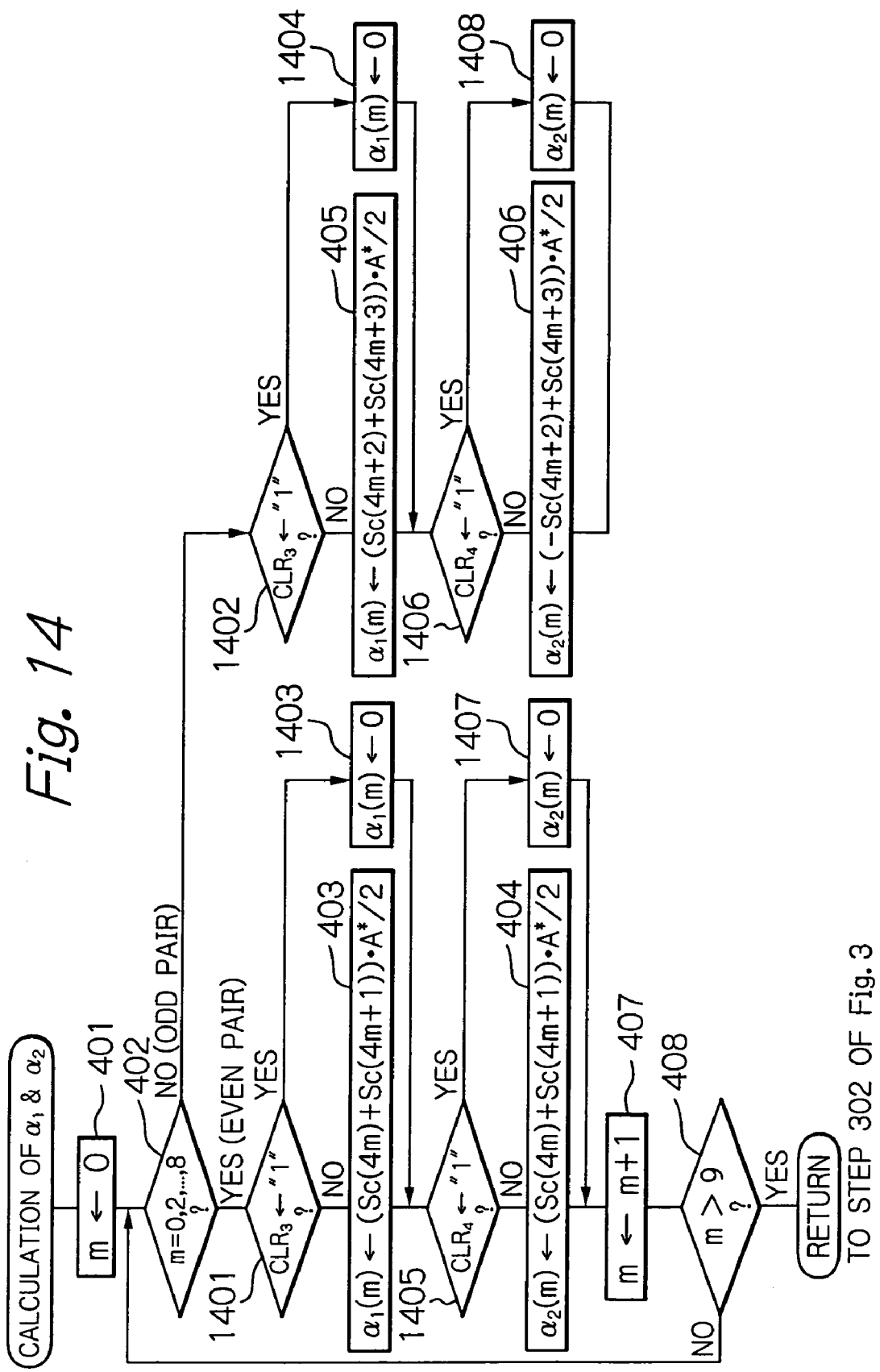
FIG. 14 is a detailed flowchart of the channel coefficient calculating step of FIG. 13B.

Even in FIG. 12, the channel coefficient calculating section 24-1, the average channel coefficient calculating sections 24-2 and 24-3, and the weighted channel coefficient calculating sections 24-4 and 24-5, the synchronous detector 25 and the channel coefficient clearing section 3 can be controlled by the CPU 28; in this case, their operation can be carried out by programs stored in the memory 29, as illustrated in FIGS. 13A, 13B and 14 as well as FIGS. 5, 6 and 7.

In FIGS. 13A and 13B, step 301 of FIG. 10B is modified to step 301' which is illustrated in detail in FIG. 14.

The flowchart of FIGS. 13A and 13B is explained below.

Steps 1001 to 1012 are carried out in the same way as in FIG. 10A.

Next, at step 301', complex channel coefficients $\alpha_1(m)$ and $\alpha_2(m)$ (m=0, 1, ..., 9) are calculated. The details of step 301' are illustrated in FIG. 14.

In FIG. 14, steps 1401 to 1108 are added to the flowchart of FIG. 4. That is, when it is determined at step 1401 or 1402 that the flag $CLR_3$ is "1" the control proceeds to step 1403 or 1404 which clears $\alpha_1(m)$. Also, when it is determined at step 1405 or 1406 that the flag $CLR_4$ is "1", the control proceeds to step 1407 or 1408 which clears $\alpha_2(m)$. Thus, the channel coefficients $\alpha_1(m)$ and $\alpha_2(m)$ are cleared in accordance with the flag $CLR_3$ and $CLR_4$, respectively.

Returning to FIG. 13B, at step 302', average complex channel coefficients $\alpha_{1A}(m)$ and $\alpha_{2A}(m)$ (m=0, 1, . . . , 9) are calculated in the same way as in FIG. 10B.

Next, at step 303, weighted complex channel coefficients $\alpha_{1S}(m)$ and $\alpha_{2S}(m)$ are calculated in the same way as in FIG. 10B.

Next, at step 304, demodulated signals $T_P$ are calculated in the same way as in FIG. 10B.

Thus, the flowchart of FIGS. 13A and 13B is completed.

Thus, even in the above-described second embodiment, since the estimation of channels is carried out in accordance with a path switching using the fluctuation of a phase difference between the received signals from the antennas 11 and 12, the high quality of reception can be obtained without increasing the number of correlators.

Figure 15:
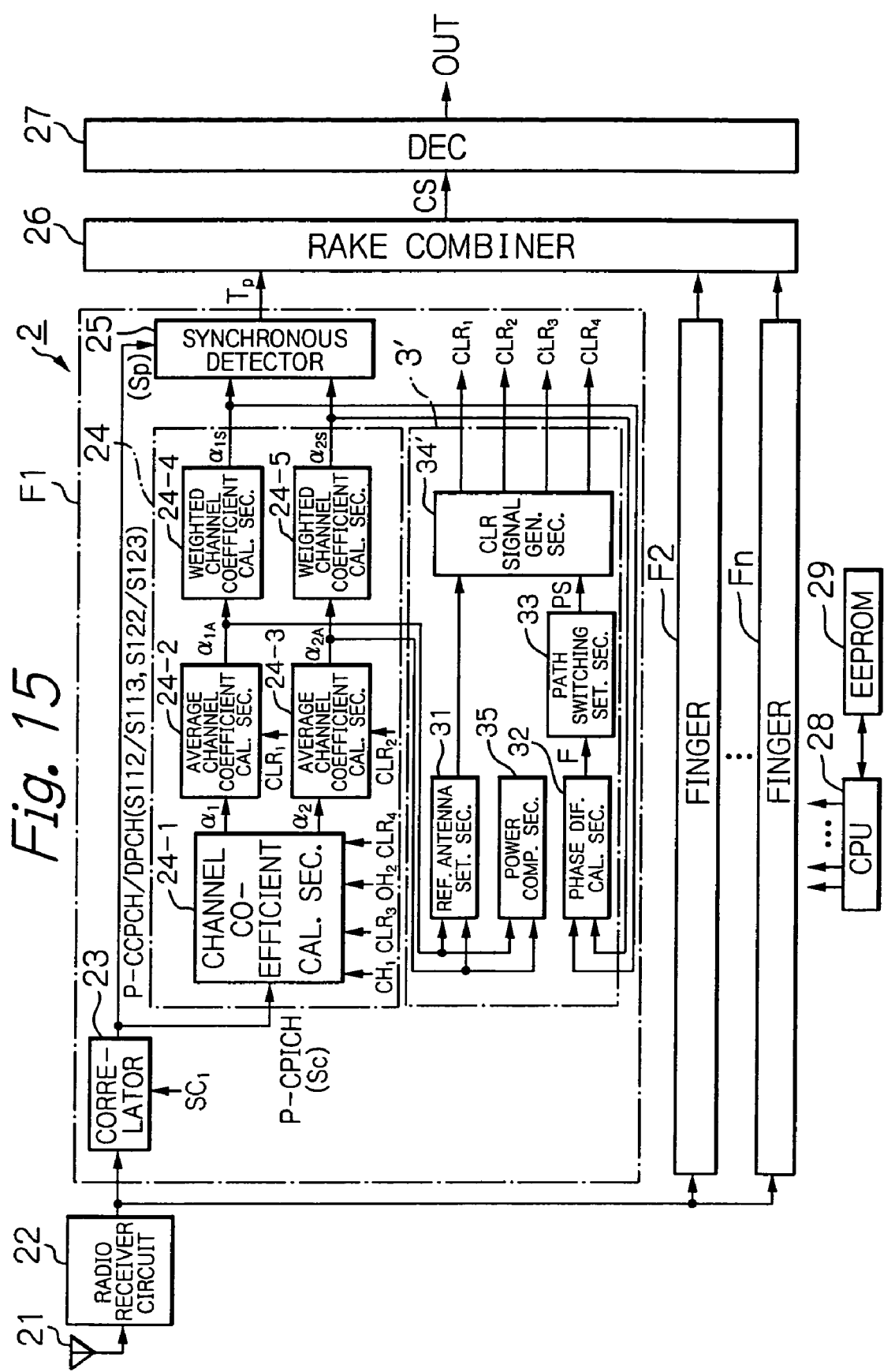
FIG. 15 is a block circuit diagram illustrating a third embodiment of the mobile station according to the present invention.

In FIG. 15, which illustrates a third embodiment of the mobile station according to the present invention, the first embodiment of FIG. 9 and the second embodiment of FIG. 12 are combined, so that a channel coefficient clearing section 3' generates the clearing signals $CLR_1$ and $CLR_2$ of the channel coefficient clearing section 3 of FIG. 9 as well as the clearing signals $CLR_3$ and $CLR_4$ of the coefficient clearing section 3 of FIG. 12. In this case, the switching of the clearing signals $CLR_1$ and $CLR_2$ and the clearing signals $CLR_3$ and $CLR_4$ is carried out based on whether or not the power value $P_1$ or $P_2$ of the received signals from the non-reference antenna is larger than a threshold value $P_{th}$.

That is, in the channel coefficient clearing section 3', a power comparing section 35 for comparing the power value $P_1$ or $P_2$ of the received signals from the non-reference antenna 11 or 12 with the threshold value $P_{th}$ is added to the elements of the channel coefficient clearing section 3 of FIGS. 9 and 12, and the clearing signal generating section 34' of FIGS. 9 and 12 is modified to a clearing signal generating section 34'.

As a result, when the power value $P_1$ or $P_2$ of the received signals from the non-reference antenna 11 or 12 is larger than the threshold value $P_{th}$, the clearing signal generating section 34' causes only one of the clearing signals $CLR_1$ and $CLR_2$ to be "1". In this case, the received signals from the non-reference antenna 11 or 12 are still considered to be effective, so that the corresponding channel coefficients $\alpha_1(m)$ or $\alpha_2(m)$ are still considered to be non-zero. Therefore, the corresponding average channel coefficients $\alpha_{1A}(m)$ or $\alpha_{2A}(m)$ are also still considered to be non-zero.

On the other hand, when the power value $P_1$ or $P_2$ of the received signals from the non-reference antenna 11 or 12 is not larger than the threshold value $P_{th}$, the clearing signal generating section 34' causes only one of the clearing signals $CLR_3$ and $CLR_4$ to be "1". In this case, the received signals from the non-reference antenna 11 or 12 are considered to include only noise and be non-effective, so that the corresponding channel coefficients $\alpha_1(m)$ or $\alpha_2(m)$ are considered to be zero. Therefore, the corresponding average channel coefficients $\alpha_{1A}(m)$ or $\alpha_{2A}(m)$ are also considered to be zero.

Figure 16B:
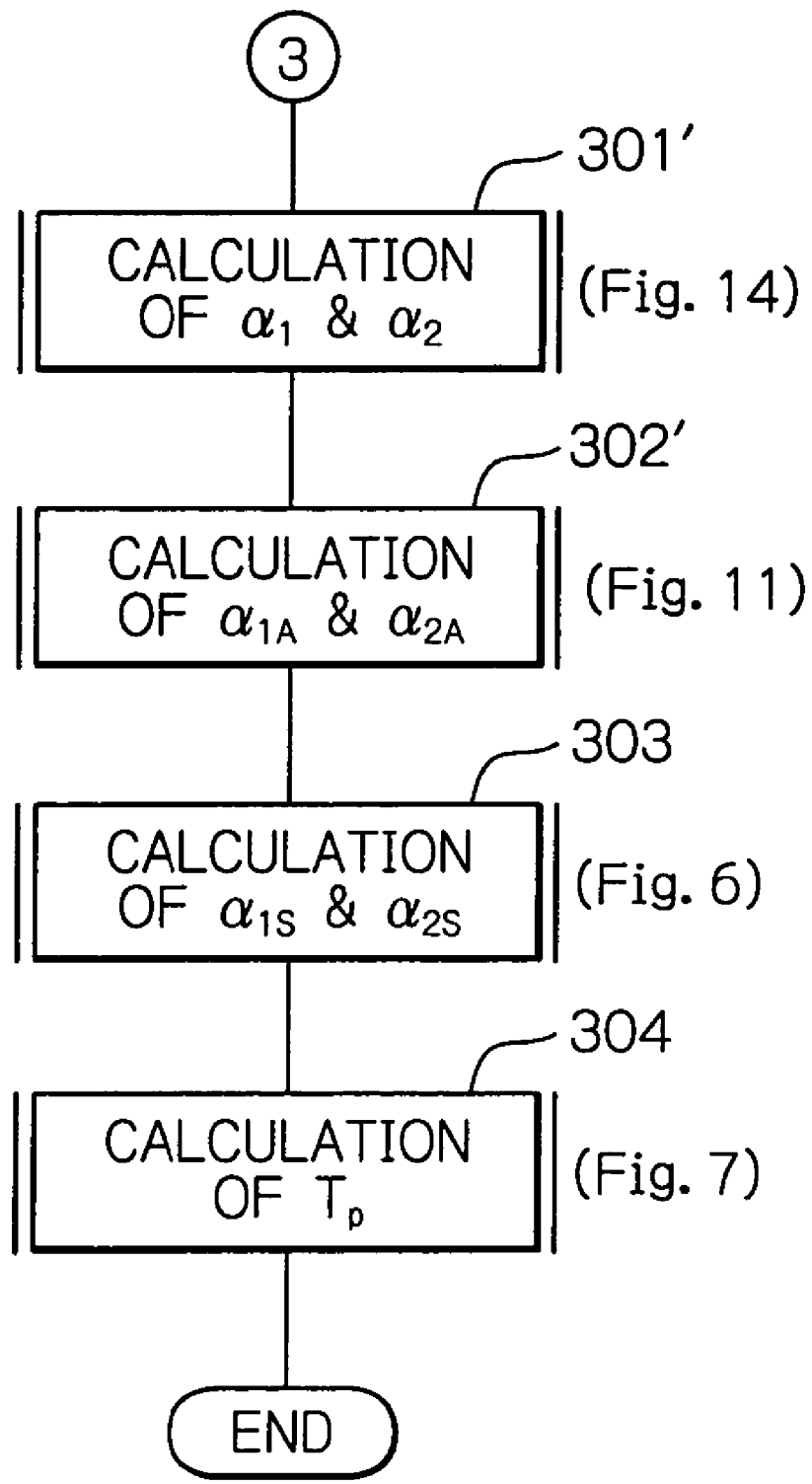

Even in FIG. 15, the channel coefficient calculating section 24-1, the average channel coefficient calculating sections 24-2 and 24-3, and the weighted channel coefficient calculating sections 24-4 and 24-5, the synchronous detector 25 and the channel coefficient clearing section 3' can be controlled by the CPU 28; in this case, their operation can be carried out by programs stored in the memory 29, as illustrated in FIGS. 16A and 16B as well as FIGS. 6, 7, 11 and 12.

The flowchart of FIGS. 16A and 16B is explained below.

Steps 1001 to 1009 are carried out in the same way as in FIG. 10A.

At step 1601, it is determined whether or not $P_2$ is larger than $P_{th}$. In this case, note that the antenna 12 is a non-reference antenna. As a result, when $P_2 > P_{th}$, the control proceeds to step 1602 where
$CLR_1 \leftarrow$ "0"
$CLR_2 \leftarrow$ "1"
$CLR_3 \leftarrow$ "0"
$CLR_4 \leftarrow$ "0"
Therefore, the average channel coefficients $\alpha_2(m)$ will be cleared by step 302'. On the other hand, when $P_2 \leq P_{th}$, the control proceeds to step 1603 where
$CLR_1 \leftarrow$ "0"
$CLR_2 \leftarrow$ "0"
$CLR_3 \leftarrow$ "0"
$CLR_4 \leftarrow$ "1"
Therefore, the channel coefficients $\alpha_2(m)$ will be cleared by step 301'.

At step 1604, it is determined whether or not $P_1$ is larger than $P_{th}$. In this case, note that the antenna 11 is a non-reference antenna. As a result, when $P_1 > P_{th}$, the control proceeds to step 1605 where
$CLR_1 \leftarrow$ "1"
$CLR_2 \leftarrow$ "0"
$CLR_3 \leftarrow$ "0"
$CLR_4 \leftarrow$ "0"
Therefore, the average channel coefficients $\alpha_1(m)$ will be cleared by step 302'. On the other hand, when $P_1 \leq P_{th}$, the control proceeds to step 1606 where
$CLR_1 \leftarrow$ "0"
$CLR_2 \leftarrow$ "0"
$CLR_3 \leftarrow$ "1"
$CLR_4 \leftarrow$ "0"
Therefore, the channel coefficients $\alpha_1(m)$ will be cleared by step 301'.

When it is determined that $\Delta F \leq \theta$, the control proceeds to step 1601 where
$CLR_1 \leftarrow$ "0"
$CLR_2 \leftarrow$ "0"
$CLR_3 \leftarrow$ "0"
$CLR_4 \leftarrow$ "0"
Next, at step 301', complex channel coefficients $\alpha_1(m)$ and $\alpha_2(m)$ (m=0, 1, . . . , 9) are calculated. The details of step 301' are illustrated in FIG. 14.

Next, at step 302', average complex channel coefficients $\alpha_{1A}(m)$ and $\alpha_{2A}(m)$ (m=0, 1, . . . , 9) are calculated. The details of step 302' are illustrated in FIG. 11.

Next, at step 303, weighted complex channel coefficients $\alpha_{1S}(m)$ and $\alpha_{2S}(m)$ are calculated in the same way as in FIG. 10B.

Next, at step 304, demodulated signals $T_P$ are calculated in the same way as in FIG. 10B.

Thus, the flowchart of FIGS. 16A and 16B is completed.

Thus, even in the above-described third embodiment, since the estimation of channels is carried out in accordance with a path switching using the fluctuation of a phase difference between the received signals from the antennas 11 and 12, the high quality of reception can be obtained without increasing the number of correlators. In this case, since the channel coefficients $\alpha_1(m)$ and $\alpha_2(m)$ or the average channel coefficients $\alpha_{1A}(m)$ and $\alpha_{2A}(m)$ are cleared in accordance with the smaller power value, the channel estimation can be more effectively and accurately carried out.

For example, assume that the mobile station 2 is moving at a speed of 150 km/h. Generally, since the frequency of transmission signals used in a W-CDMA system is 2 GHz, i.e., the wavelength is about 0.15 m. Therefore, the electric field strength of the received signals by the above-mentioned mobile station 2 drops at every pitch of one wavelength, i.e., at 27.8 Hz, which means that one fading phenomenon occurs at a frequency of about $3.6 \times 10^{-3}$ s.

Since one symbol has a time period of $67.7 \times 10^{-6}$ s, one fading phenomenon occurs at every 53 symbols. If a margin of two is considered, one fading phenomenon occurs at every 26 symbols, so that one fading phenomenon is assumed to occur at every 24 symbols in consideration of a margin of two symbols. According to this assumption, an in-phase addition can be performed upon 24 symbols at most in a W-CDMA system using no transmission diversity method, and an in-phase addition can be performed upon 12 symbols at most in a W-CDMA system using two-antenna transmission diversity method. According to the present invention, even in a W-CDMA system using two-antenna transmission diversity method, since the channel estimation is substantially carried out by using one antenna, an in-phase addition can be performed upon 24 symbols, which would improve the quality of received signals.

The invention claimed is:

1. A mobile station comprising:
    a radio receiver circuit adapted to receive first and second signals from first and second antennas of a base station;
    a plurality of fingers connected to said radio receiver circuit and each adapted to demodulate said first and second signals for one propagation path; and
    a Rake combiner connected to said fingers and adapted to combine demodulated signals of said fingers by removing phase fluctuations among said fingers,
    each of said fingers comprising:
        a correlator adapted to descramble said first and second signals for said propagation path;
        a channel coefficient calculating section adapted to calculate first and second channel coefficients of said descrambled first and second signals;
        first and second average channel coefficient calculating sections adapted to calculate first and second average channel coefficients of said first and second channel coefficients, respectively;
        a synchronous detector adapted to perform a synchronous detection upon said descrambled first and second signals in accordance with said first and second average channel coefficients; and
        a channel coefficient clearing section adapted to detect a path switching of said first and second signals to clear either one of said first and second channel coefficients or one of said first and second average channel coefficients.

2. The mobile station as set forth in claim 1, wherein said channel coefficient clearing section detects said path switching by a fluctuation between said descrambled first and second signals.

3. The mobile station as set forth in claim 1, wherein said channel coefficient clearing section comprises:
    a reference antenna setting section adapted to calculate electric field strengths of said first and second signals to cause one of said first and second antennas to be a reference antenna and the other to be a non-reference antenna in accordance with said electric field strengths;
    a phase difference calculating section adapted to calculate a phase difference between said first and second signals;
    a path switching detecting section adapted to detect a path switching in accordance with said phase difference; and
    a clearing section for clearing the one of said first and second channel coefficients or the one of said first and second average channel coefficients for said non-reference antenna when said path switching is detected.

4. The mobile station as set forth in claim 3, wherein said channel coefficient clearing section further comprises a power comparing section adapted to compare the electric field strength of said first signal with that of said second signal,
    said clearing section clearing the one of said first and second coefficients or the one of said first and second average coefficients in accordance with a comparison result of said power comparing section.

5. The mobile station as set forth in claim 1, wherein each of said fingers comprises first and second weighted channel coefficient calculating sections adapted to calculate first and second weighted channel coefficients of said first average channel coefficients, respectively, so that said synchronous detector performs said synchronous detection upon said descrambled first and second signals using said first and second weighted channel coefficients instead of said first and second average channel coefficients.

6. A mobile station adapted to receive first and second signals from first and second antennas of a base station via a plurality of propagation paths and Rake-combine said received first and second signals by removing phase fluctuation among said signals, comprising:
    a plurality of receiving sections each adapted to receive said first and second signals to generate first and second received signals for one of said propagation paths;
    a plurality of channel estimating sections each connected to one of said receiving sections and adapted to calculate first and second channel coefficients of said first and second received signals and calculate first and second average channel coefficients of said first and second channel coefficients, respectively, as channel estimating values; and
    a plurality of synchronous detectors, each connected to one of said channel estimating sections and adapted to perform a synchronous detection upon said first and second received signals in accordance with one of said channel estimated values,
    each of said channel estimating sections detecting a path switching from one of said propagation paths to another and clearing one of said first and second channel coefficients when said path switching is detected.

7. The mobile station as set forth in claim 6, wherein each of said channel estimating sections detects said path switching by a phase fluctuation between said first and second received signals.

8. A mobile station adapted to receive first and second signals from first and second antennas of a base station via a plurality of propagation paths and Rake-combine said received first and second signals by removing phase fluctuation among said signals, comprising:
    a plurality of receiving sections each adapted to receive said first and second signals to generate first and second received signals for one of said propagation paths;
    a plurality of channel estimating sections each connected to one of said receiving sections and adapted to calculate first and second channel coefficients of said first and second received signals and calculate first and second average channel coefficients of said first and second channel coefficients, respectively, as channel estimating values; and
    a plurality of synchronous detectors, each connected to one of said channel estimating sections and adapted to perform a synchronous detection upon said first and second received signals in accordance with one of said channel estimated values, each of said channel estimating sections detecting a path switching from one of said propagation paths to another and clearing one of said first and second average channel coefficients when said path switching is detected.

9. The mobile station as set forth in claim 8, wherein each of said channel estimating sections detects said path switching by a phase fluctuation between said first and second received signals.

10. A mobile station adapted to receive first and second signals from first and second antennas of a base station via a plurality of propagation paths and Rake-combine said received first and second signals by removing phase fluctuation among said signals, comprising:
   a plurality of receiving sections each adapted to receive said first and second signals to generate first and second received signals for one of said propagation paths;
   a plurality of channel estimating sections each connected to one of said receiving sections and adapted to calculate first and second channel coefficients of said first and second received signals and calculate first and second average channel coefficients of said first and second channel coefficients, respectively, as channel estimating values; and
   a plurality of synchronous detectors, each connected to one of said channel estimating sections and adapted to perform a synchronous detection upon said first and second received signals in accordance with one of said channel estimated values,
   each of said channel estimating sections detecting a path switching from one of said propagation paths to another, comparing a smaller one of electric field strengths of said first and second received signals with a threshold value, and clearing one of said first and second channel coefficients or one of said first and second average channel coefficients in accordance with a comparing result of the smaller one of the electric fields with the threshold value when said path switching is detected.

11. The mobile station as set forth in claim 10, wherein each of said channel estimating sections detects said path switching by a phase fluctuation between said first and second received signals.

12. A channel estimating apparatus used in a mobile station adapted to receive first and second signals from first and second antennas of a base station via a plurality of propagation paths, comprising:
   a section adapted to calculate first and second channel coefficients of said first and second signals;
   a section for calculating first and second average channel coefficients of said first and second channel coefficients, respectively, as channel estimating values,
   so that one of said first and second channel coefficients or one of said first and second average channel coefficients is cleared when a path switching from one of said propagation paths to another is detected.

13. A method adapted to receive first and second signals from first and second antennas of a base station via a plurality of propagation paths and Rake-combine said received first and second signals by removing phase fluctuation among said signals, comprising:
   descrambling said received first and second signals for said propagation path;
   calculating first and second channel coefficients of said descrambled first and second signals;
   calculating average channel coefficients of said first and second channel coefficients, respectively;
   performing a synchronous detection upon said descrambled first and second signals in accordance with said first and second average channel coefficients; and
   detecting a path switching of said first and second signals to clear either one of said first and second channel coefficients or one of said first and second average channel coefficients.

14. The mobile station as set forth in claim 1, wherein a channel estimation is substantially carried out by using at most one of said first and second antennas.

15. The method as set forth in claim 13, further comprising:
   calculating a power value P1 of said first signal and a power value P2 of said second signal;
   setting a flag FX to a first value if $P1 \geq P2$ and to a second value if $P1 < P2$,
   wherein said first value indicates said first antenna comprises a reference antenna and said second antenna comprises a non-reference antenna, and
   said second value indicates said first antenna comprises a non-reference antenna and said second antenna comprises a reference antenna.

16. The method as set forth in claim 14, further comprising:
   calculating a phase difference between said first and second signals;
   calculating a fluctuation of a present value F of said phase difference from a previous value F0 of said phase difference; and
   comparing said fluctuation with a predetermined value θ.

17. The method as set forth in claim 16, wherein said phase difference is calculated in accordance with said channel coefficients.

18. The method as set forth in claim 16, wherein said phase difference is calculated in accordance with said average channel coefficients.

19. The method as set forth in claim 16, wherein said phase difference is calculated in accordance with weighted channel coefficients.

20. The method as set forth in claim 16,
   wherein said path switching step further comprises generating and transmitting a path switching signal PS if said fluctuation is greater than said predetermined value θ, and
   wherein said path switching signal PS is turned into a clearing signal such that a one of said average channel coefficient calculations corresponding to said non-reference antenna is disabled to clear said corresponding average channel coefficients.

* * * * *